United States Patent [19]
Hanzawa et al.

[11] Patent Number: 5,231,685
[45] Date of Patent: Jul. 27, 1993

[54] MULTI-WAY ELECTRO-OPTIC CONNECTOR ASSEMBLIES AND OPTICAL FIBER FERRULE ASSEMBLIES THEREFOR

[75] Inventors: Hideyuki Hanzawa; Etsuro Doi; Toshihiro Nonaka, all of Tama, Japan

[73] Assignee: Kel Corporation, Tokyo, Japan

[21] Appl. No.: 617,990

[22] Filed: Nov. 26, 1990

[30] Foreign Application Priority Data

| Nov. 28, 1989 | [JP] | Japan | 1-306679 |
| Nov. 28, 1989 | [JP] | Japan | 1-306680 |
| Nov. 28, 1989 | [JP] | Japan | 1-306681 |
| Nov. 28, 1989 | [JP] | Japan | 1-306682 |

[51] Int. Cl.⁵ .............................. G02B 6/36
[52] U.S. Cl. .......................... 385/84; 385/87; 385/92; 385/139
[58] Field of Search ............... 350/96.20, 96.21, 96.22; 385/84, 87, 92, 139

[56] References Cited

U.S. PATENT DOCUMENTS

| 4,261,643 | 4/1981 | Stiles et al. | 350/96.20 |
| 4,305,642 | 12/1981 | Bloodworth, Jr. et al. | 350/96.20 |
| 4,355,862 | 10/1982 | Kock | 350/96.20 |
| 4,435,036 | 3/1984 | Sasakawa | 350/96.20 |
| 4,447,120 | 5/1984 | Borsuk | 350/96.20 |
| 4,447,121 | 5/1984 | Cooper et al. | 350/96.20 |
| 4,948,222 | 8/1990 | Corke et al. | 350/96.20 |
| 4,964,685 | 10/1990 | Savitsky et al. | 350/96.20 |

*Primary Examiner*—Frank Gonzalez
*Attorney, Agent, or Firm*—Robert W. J. Usher

[57] ABSTRACT

A multi-way, electro-optic connector comprises an optical fiber plug connector 1 and an electro-optic receptacle connector 100. Identical cover members 2 and 3, of the plug connector 1 define divergently curving optical fiber guiding channels 23 of at least a minimum curvature obviating transmission losses. Ferrule assemblies 5, each include an outer ferrule 25 receiving a reinforcing tube 26 and an inner ferrule 27 having slits 27a in optical fiber receiving ends and force-fitted into the reinforcing tube 26 with the core 24 received in a bore 31 of the outer ferrule as a sliding fit. Clamping collars, 9 and 10 are deformed to clamp cable reinforcing fibers 8 by assembly of the cover members 2,3. A one-piece, ganged sleeve member 130 and a retaining member 150 retain transducers 140 with leads trapped in grooves 138a,b and 139 for subsequent insertion in a main receptacle housing 110.

26 Claims, 21 Drawing Sheets

Fig 6(A)
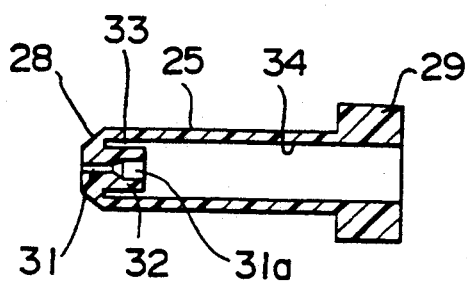
Fig 6(B)
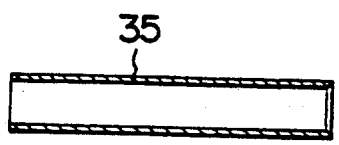
Fig 7
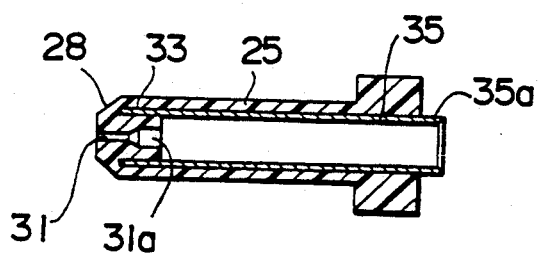
Fig 8(A)
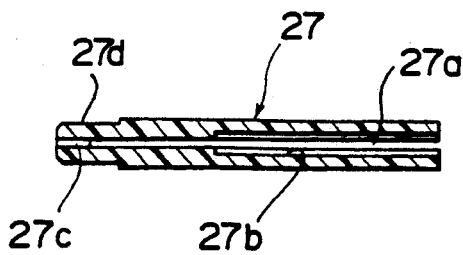
Fig 8(B)
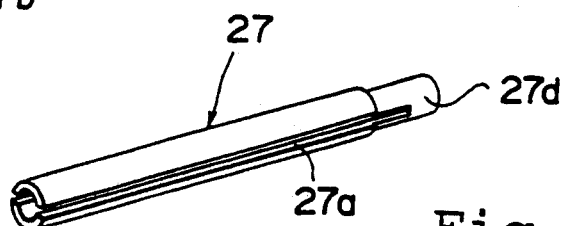
Fig 8(C)
Fig 9
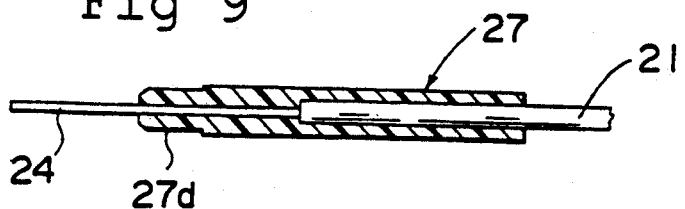

Fig 10(A)    Fig 10(B)    Fig 10(C)
Fig 10(D)    Fig 11
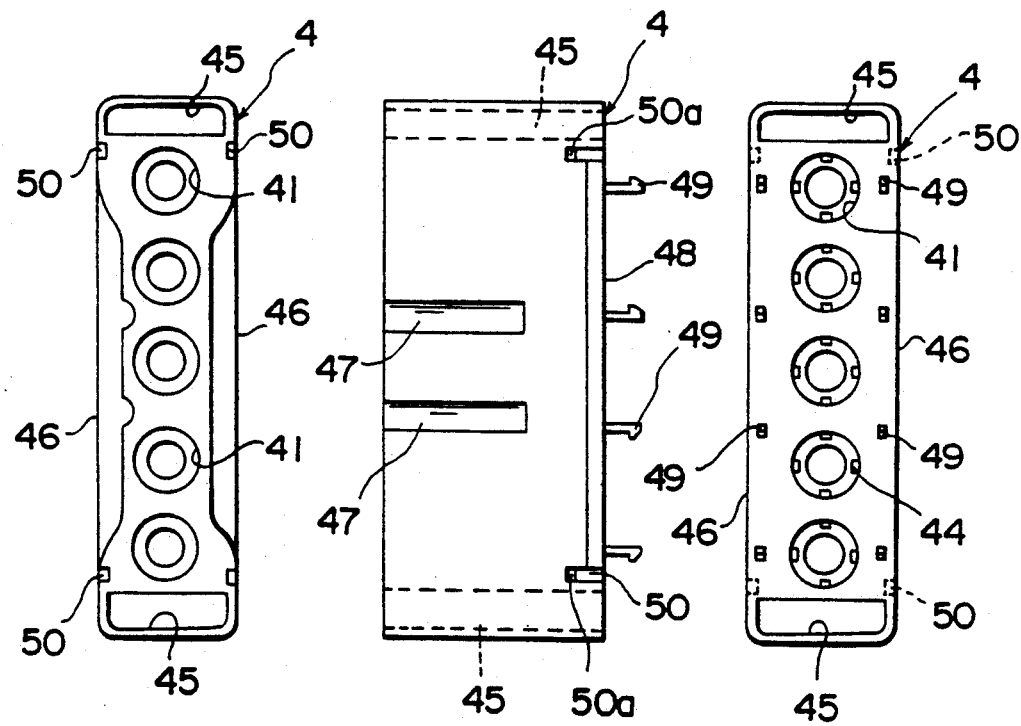
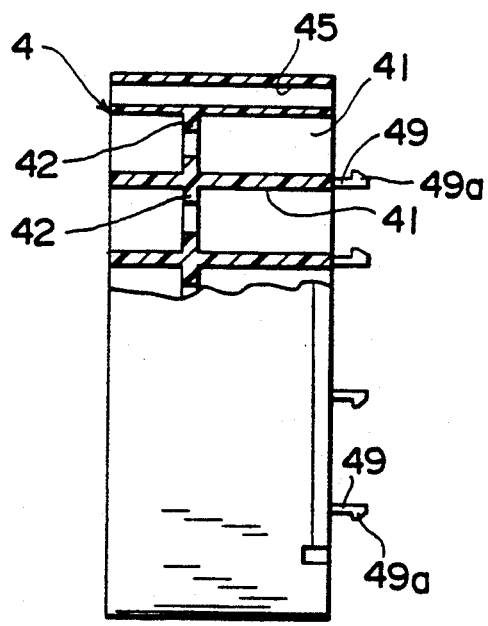
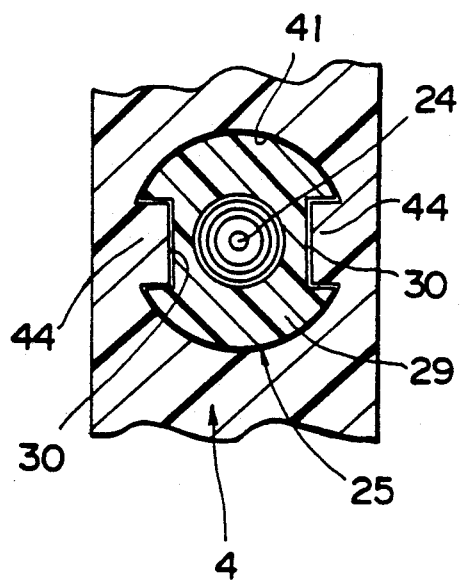

MULTI-WAY ELECTRO-OPTIC CONNECTOR ASSEMBLIES AND OPTICAL FIBER FERRULE ASSEMBLIES THEREFOR

FIELD OF THE INVENTION

The invention relates to multi-way, electro-optic connector assemblies comprising intermatable multi-way, optical fiber plug connectors and multi-way, electro-optic transducer receptacle connectors. In particular, the invention concerns a ferrule assembly for terminating an optical fiber in the plug connector and concerns the multi-way, receptacle connector. The invention embraces other aspects of the assembly including optical fiber cable cover members of the plug connector and a clamping assembly for securing reinforcing strands of an optical fiber cable sheath.

BACKGROUND OF THE INVENTION

Multi-way, electro-optic connector assemblies including multi-way, optical fiber plug connectors for providing a series of transmission lines for high density optical signals are well known and used increasingly widely.

In one type of plug connector, ferrules terminating precisely centered cores of respective optical fibers of a cable are arranged in parallel relation in a row at a mating face of the connector.

In such plug connector, the individual optical cores of respective optical fibers have conventionally been threaded into through-bores in the ferrules and fixed, precisely centered, therein using adhesives. However, such approach is relatively complex and exacting, with difficulties in manipulating the optical fiber and, in consequence, time-consuming. Furthermore, good strain relief, particularly in respect of tensile or pulling stress is not obtained, precluding high reliability.

Conventional multi-way, electro-optic connector assemblies for establishing multiple communications pathways also include multi-way, electro-optic transducer receptacle connectors for mating with the optical fiber plug connectors and having a series of light receiving and generating elements referred to as electro-optic transducers, such as light-emitting diodes as sources of optical signals. In such connectors it is extremely important that the active or light-emitting and receiving surfaces of the transducers are precisely aligned to extend centered on and, usually, perpendicular to the optical axes of the respective optical fibers when the plug connector and receptacle connector are mated. Clearly, therefore, it is important that the transducers be accurately and stably retained in predetermined positions in housing structures of the connectors in which they are mounted as, any slight deviation or movement from the precise alignment will result in a transmission loss at the interface with the optical fiber and, possibly, in a spurious, interfering signal being conveyed along the pathway or transmission line.

Conventionally, the transducers have been retained in respective transducer receiving sections of ganged sleeve members which should also be fixed accurately in a main or outer receptacle housing body which receives the plug connector in mating relation. Furthermore, particularly for printed circuit board applications, and for reasons of standardization, the numerous transducers should all be fixed in a horizontal row under the same conditions.

However, the conventional multi-way, electro-optic transducer receptacle connectors have not proven entirely satisfactory in fixing the numerous transducers in specific positions with high accuracy. In addition, such conventional connectors have a relatively large number of small parts, requiring complex assembly operations.

SUMMARY OF THE INVENTION

It is an object of the invention to provide a ferrule assembly which obviates of ameliorates the above-mentioned disadvantages.

In particular, one object of the invention is to provide a ferrule assembly affording a high degree of accuracy in mounting the optical fiber while also providing adequate strain relief to obtain high reliability, meeting or exceeding, exacting industry requirements and, preferably, approaching a zero defect standard.

It is another object of the invention to enable reliable and effective termination of an optical fiber in a relatively rapid manner while facilitating manipulation of the fiber and ferrule to enable termination at high accuracy in a cost effective manner without requiring a high level of operator skill.

It is another object of the invention to provide a multi-way, electro-optic transducer receptacle connector which comprises relatively fewer separate parts, is relatively easily assembled and yet reliably fixes the individual transducers in precise alignment with the optical fibers with high accuracy thereby reducing any transmission loss across the connection between the transducer and the optical fiber to a minimum.

According to one aspect of the invention, there is provided a ferrule assembly for terminating an optical fiber in a multi-way, plug connector comprising an outer ferrule made in one piece of plastic material and comprising a tubular body wall having front, mating and rear, optical fiber receiving axial ends, and defining at the front end an axially extending, optical fiber core receiving through-bore and, rearwardly thereof, a socket of larger diameter than the through-bore opening at the rear end; a rigid, reinforcing tube for receipt as a force fit in the socket in co-axial relation therewith as a force fit forming a subassembly; and, an inner, optical fiber core protecting ferrule made in one-piece of plastic material and comprising a tubular body wall having front and rear, axial ends and defining an axially extending through-passageway, the rear end of the inner ferrule being split by at least one slit formed through the wall thereof and extending axially forwardly to a location spaced from the front end, whereby the rear end of the inner ferrule can be spread permitting insertion of a prepared end of a optical fiber into and along the through-passageway until a portion of the core protrudes from the front, axial end and the inner ferrule subsequently force-fitted in the reinforcing tube of the subassembly to extend co-axially therewith with the protruding portion of the core received in the through-bore of the outer ferrule as a sliding fit.

The provision of the slits not only enables the rear part of the inner ferrule to be of increased width and to be expanded or spread to facilitate accurate insertion of an optical fiber end portion prepared with an exposed core, while the workability or adjustability of the arrangement is also greatly improved. Furthermore, the reinforcing tube prevents any radially outward forces, produced by force fitting the inner ferrule therein, being transmitted to the outer ferrule, obviating risk of strain and distortion or breakage thereof. As adhesive is not used, the mechanical strength of the ferrule in relation to the strain relief afforded to the optical fiber core can also be improved.

Such improvements are achieved with a ferrule assembly of relatively simple construction, having components adapted for economical mass production, in terms of both manufacture and assembly, resulting in acceptably low applied cost.

Preferably, the inner ferrule is formed with two such slits located, respectively, at diametrically opposite locations providing a more even distribution of force during spreading and optical fiber insertion, aiding manipulation and providing a more even distribution of compressive force on the optical fiber both during and subsequent to force fitting in the reinforcing tube, thereby also improving strain relief.

Preferably, each slit increases in width as it extends axially rearwardly of the inner ferrule thereby further to improve both the ease and extent of spreading, and ease of insertion of the optical fiber therein.

According to the precise degree of spreading required, each slit may terminate at a location adjacent the front end of the inner ferrule in communication with a core receiving portion or, adjacent a middle of the ferrule in communication with a section of the passageway receiving an unstripped portion of the optical fiber.

Advantageously, a rear, axial end of the reinforcing tube protrudes axially rearwardly from the rear, axial end of the outer ferrule for retention of an axial end of a biassing coil spring located on the terminated optical fiber in abutment with the rear end of the ferrule assembly.

Preferably, the outer ferrule body is formed internally with a thickened or transversely extending wall portion adjacent the front end, constituting a blind end of the socket, through which wall portion the through-bore extends, and an annular groove is formed in the wall portion to extend co-axially of the socket and receiving a leading end of the reinforcing tube in a force fit. The outside diameter of the groove preferably matches or equals the inside diameter of the reinforcing tube so that the reinforcing tube forms a force fit with the tubular wall of the outer ferrule.

Thus, not only does the reinforcing tube protect the outer ferrule from internally applied radial stresses but also provides support for the tube wall, at least at locations adjacent the front end preventing distortion thereof and assuring accurate centering.

The optical fiber core receiving through-bore of the outer ferrule is formed with a rearwardly divergent portion communicating with the socket, forming a funnel-entry guide facilitating insertion of the optical fiber core into the through-bore and the front end of the inner ferrule may be rebated externally forming a guide portion of reduced diameter assisting in guiding the inner ferrule into the reinforcing tube.

A radially outwardly extending locating flange may be formed on the rear end of the outer ferrule for mounting purposes.

According to another aspect of the invention, there is provided a multi-way, electro-optic transducer receptacle connector for a multi-way, electro-optic connector assembly comprising an outer housing comprising a generally sleeve-form body having a front, mating face and a rear face, an interior wall portion extending transversely of a mating axis of the connector across the housing at a location between the front and rear faces, dividing the housing interior into front, plug receiving and rear, insert receiving compartments opening to the front and rear faces of the housing, respectively, the interior wall being formed with a row of apertures extending therethrough between the front and rear compartments; a transducer mounting insert assembly for receipt in the housing comprising a ganged sleeve member and a transducer retaining member, the ganged sleeve having a one-piece body with front and rear faces, a series of sleeve forming portions extending in side-by-side relation in a row between the front and rear faces, each sleeve forming portion having intercommunicating front and rear, mating and transducer receiving sections, respectively, opening to the front and rear of the sleeve member, a rearwardly facing transducer stop surface formed on the transducer receiving section, the transducer retaining member comprising a plate portion formed with transducer retaining means, complementary latching means of the sleeve housing and the retaining member, whereby engagement of the complimentary latching means latches the retaining plate extending across the rear face of the ganged sleeve member with the retaining means engaging rear faces of respective electro-optic transducers fitted in respective transducer receiving sections retaining them seated against the stop surface with front, active faces thereof precisely aligned with the central axes of the mating section; and, a rear cover plate attached to the outer housing, extending behind the retaining plate and retaining the insert assembly mounted in the outer housing with the transducer receiving sections of the ganged tube member located in the rear compartment and the plug receiving sections extending through the apertures into the plug connector receiving compartment of the outer housing.

In assembling the connector, the transducers are press-fitted into the transducer receiving sections of respective sleeves, their leads are bent through an angle of approximately 90° and the transducer retaining plate member is latched across the rear face of the ganged sleeve member so that the retaining means engages the rear, can-form, ends of respective transducers retaining them positioned accurately in respective sleeve sections. The insert assembly so formed is then inserted into the insert receiving compartment of the outer housing with the positions of respective transducers in respective sockets remaining undisturbed by such operation and the rear cover plate is then attached to the outer housing to extend across the rear face thereof behind the insert retaining the insert assembly securely ad stably positioned in the outer housing. As a result, a high degree of positional accuracy can be maintained with a reduction of any shift, displacement or inclination of optical axes of the multi-way, connector plug and receptacle ensuring transmission losses at the interface be kept to a minimum.

In addition, the assembly operation is simplified as all of the transducers can be inserted accurately and fixed in position a in the ganged sleeve member at the same time, in an essentially single operational step, which is simpler than assembling them one by one with the outer housing body of the receptacle connector.

Preferably, the retaining plate and the ganged sleeve member define between them lead trapping means, trapping respective leads bent to extend from the rear of respective transducers transversely of the axis, out from the insert assembly. Advantageously, the ganged sleeve member is formed with a rear wall portion and the lead trapping means comprises a series of lead receiving grooves having rearwardly opening, lead admitting mouths extending forwardly into a rear, longitudinal edge of said wall portion, and a series of forwardly extending grooves having forwardly opening mouths extending across a wall of the retaining member, the forwardly and rearwardly opening grooves being brought into registration when the retaining plate is latched to the ganged sleeve member to trap respective lead wires between bottoms of respective registering grooves of the wall portion and ganged sleeve member, respectively.

The securing of the leads between the retaining plate and the ganged sleeve member also ensures stable and accurate positioning of the transducers during handling and insertion into the outer housing.

Desirably, a rebate is formed in the front face of the plate portion of the retaining member at a location below the lead admitting slots and adjacent a board engaging face, and the rear wall portion comprises a flange which extends rearwardly and protrudes into the rebate, thereby bringing the forwardly and rearwardly opening slots into registration.

The projections may be finger-like and of precise length, with a small degree of resiliency, and symmetrically located in a ring to provide an even consistent pressure, evenly distributed around the outer radially periphery of the can of the transducer ensuring stable mounting thereof.

Advantageously, the stop surfaces are defined by rearwardly facing steps formed in respective sleeve walls.

Desirably, the rear, transducer receiving section of each sleeve is formed with a series of radially inwardly protruding, axially extending, transducer locating ribs, located at intervals around the inner periphery of a wall thereof, the ribs receiving the transducer between them in a force fit.

The outer housing is formed with passageways extending between front and rear faces adjacent opposite ends of the row of apertures and the rear cover plate has spaced apart, forwardly extending, resilient latching arms with catch means at free ends thereof, which arms extend forwardly through respective passageways into the plug connector receiving cavity for latching engagement as a snap fit with complementary latching means on a mating plug connector.

Thus, the rear cover plate both retains the insert assembly securely inserted in the outer housing and provides latching to a mating plug connector.

BRIEF DESCRIPTION OF THE DRAWINGS

A specific example of the invention will now be described with reference to the accompanying drawings in which:

FIGS. 6(A) and (B) are cross-sectional views taken along the optical axes of an outer ferrule and a reinforcing tube, respectively, of the ferrule assembly;

FIG. 7 is a similar cross-section showing the reinforcing tube fitted in the outer ferrule;

FIGS. 8(A), (B), and (C) are axial cross-sectional views of an inner ferrule of the plug connector, a leading end of optical fiber prepared for insertion in the ferrule, and a perspective view of the rear of the inner ferrule of the ferrule assembly, respectively;

FIG. 9 is a cross-sectional view taken along the optical axes of the inner ferrule with the prepared optical fiber end inserted therein;

FIG. 10(A) and (B), (C) and (D) are front elevational, plan, rear elevational, and partly sectioned underplan views of a ferrule hosing of the plug connector;

FIG. 11 is an enlarged cross-sectional view of the ferrule housing with a ferrule assembly mounted therein;

DESCRIPTION OF PREFERRED EMBODIMENTS

Figure 1:
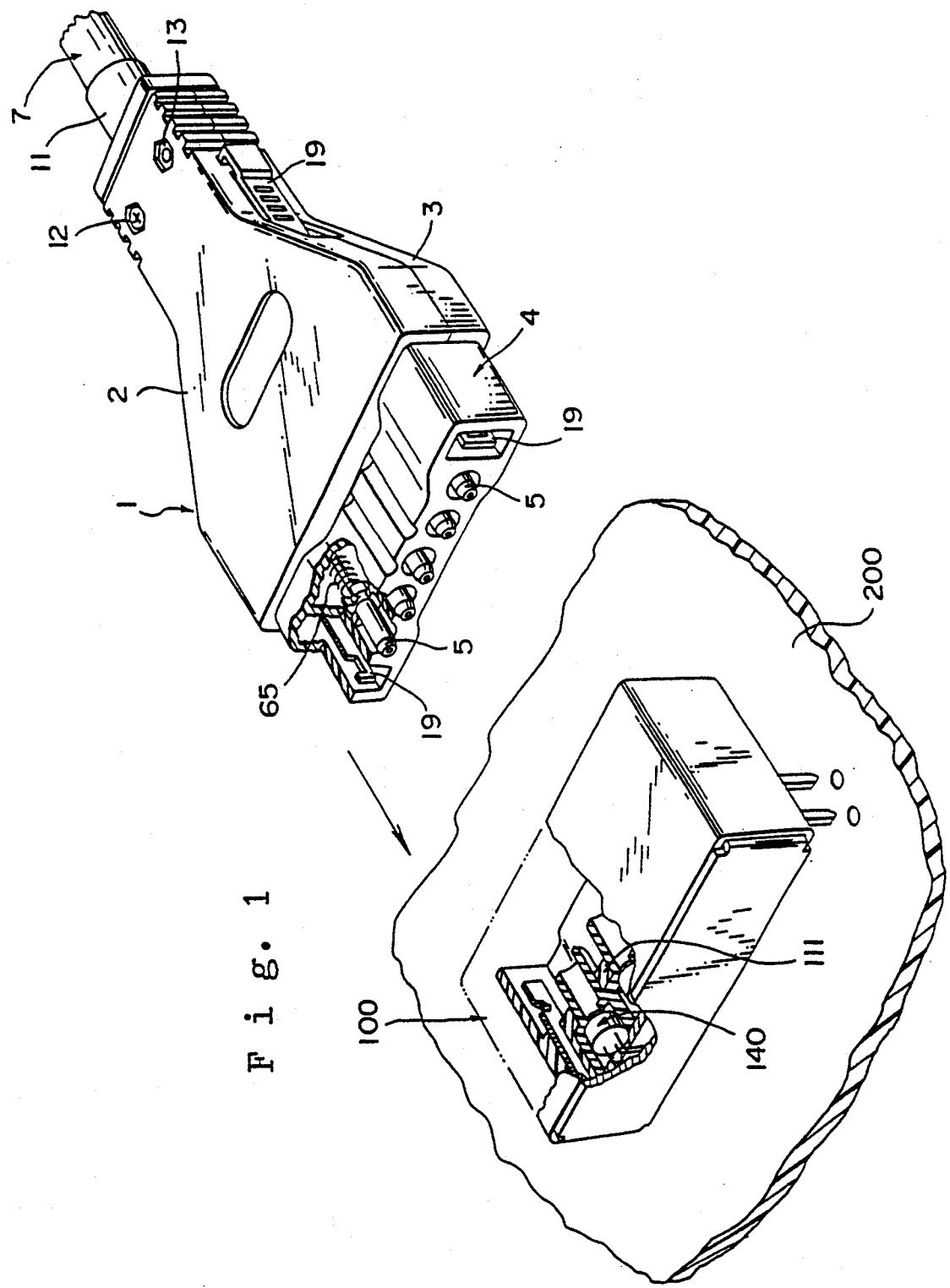
FIG. 1 is a perspective view of a multi-way, electro-optic connector assembly according to the invention, showing plug and receptacle connectors thereof, aligned for mating with portions of both partially cut away.

As shown in FIG. 1, the multi-way, electro-optic connector comprises a multi-way, optical fiber plug connector 1 and a multi-way, electro-optic receptacle connector 100 for mounting on a printed circuit board and mateable therewith.

Figure 2:
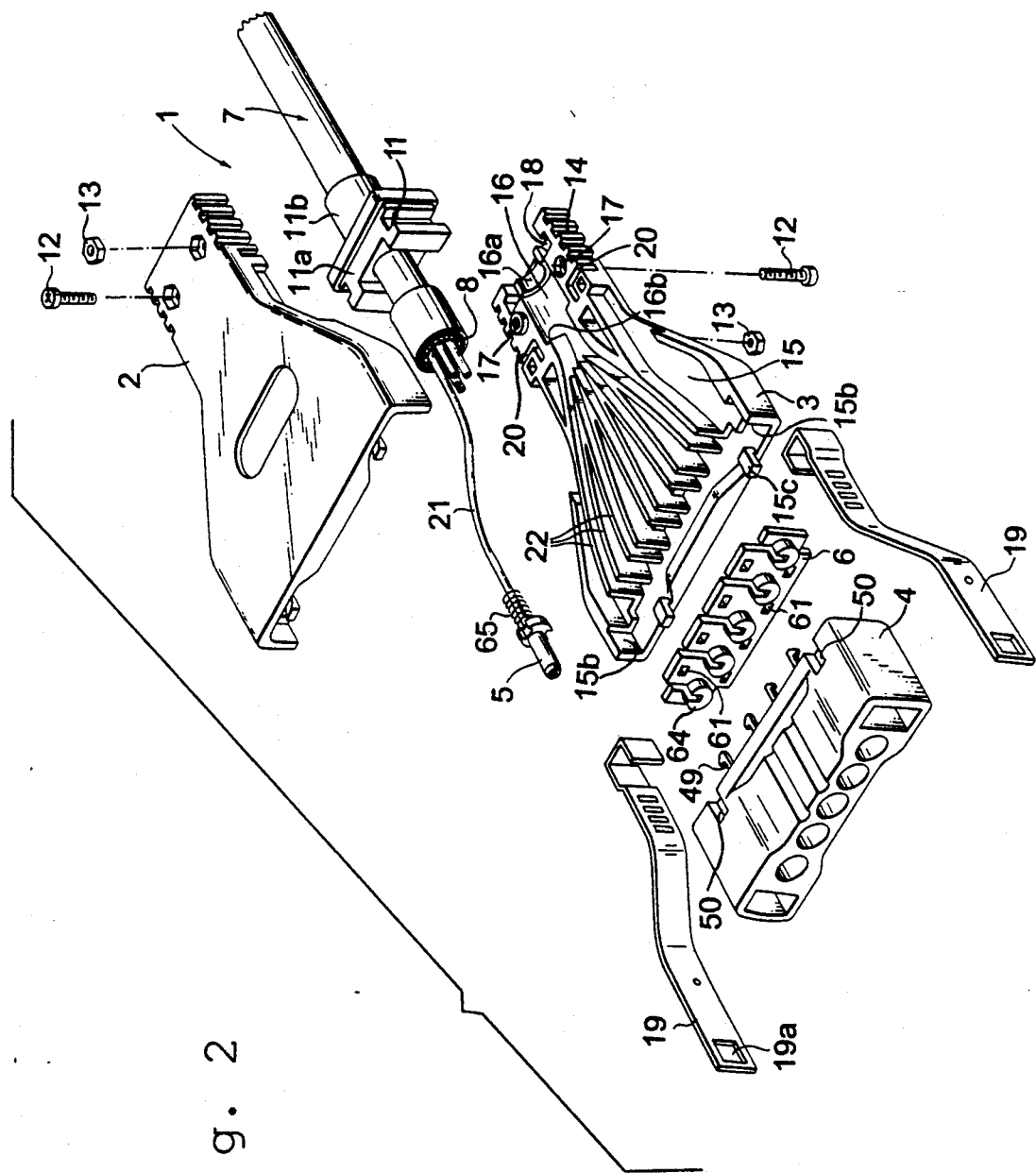
FIG. 2 is an exploded perspective view of the multi-way, electro-optic transducer receptacle connector of the assembly of FIG. 1.

As shown in FIG. 2, the plug connector comprises upper and lower, identical cover members 2 and 3, respectively, formed from an insulating resin or plastic material, a ferrule assembly housing 4, ferrule assemblies 5 mounted in the ferrule housing 4, a ferrule assembly retaining cover 6 latched to a rear face of the ferrule assembly housing for retaining the ferrule assemblies therein, two tubular clamping collars, 9 and 10 of different diameters for clamping between them reinforcing fibers 8 of an optical fiber cable 7 and a cable supporting, strain relieving member or hood 11.

Figure 3A:
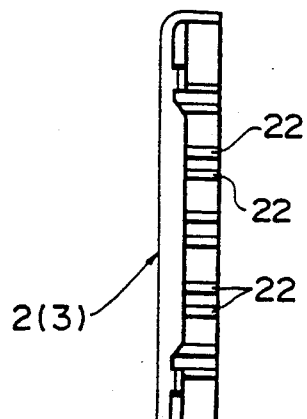
FIGS. 3(A)-(C) are front elevational, interior plan and exterior plan views, respectively, of a cover member of the plug connector of the assembly.
Figure 3B:
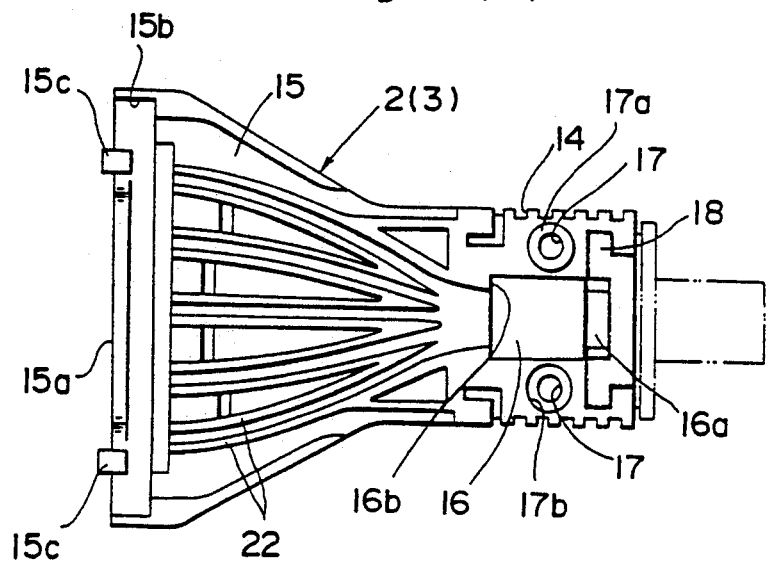
Figure 3C:
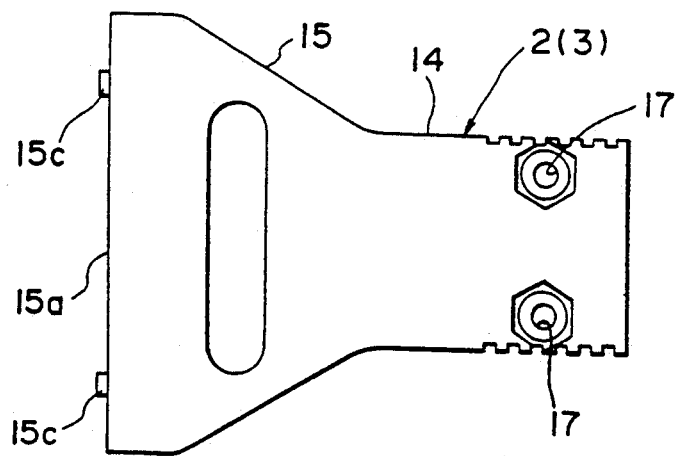
Figure 4:
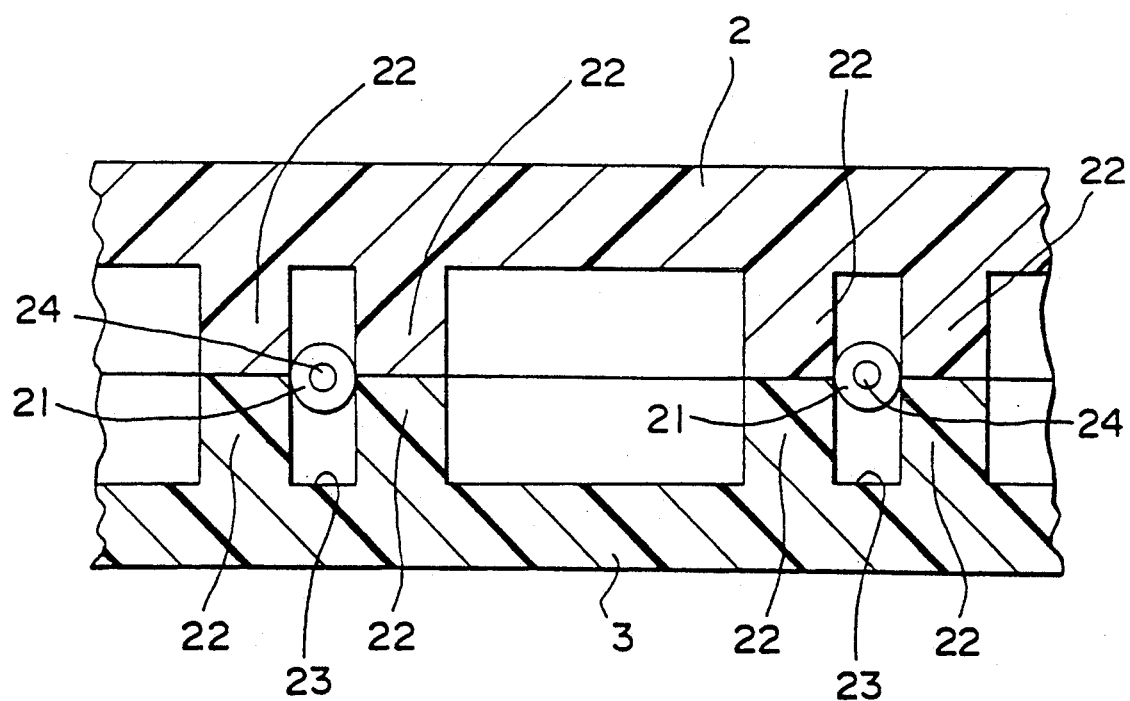
FIG. 4 is an enlarged cross-section view taken along a line extending perpendicularly through two cover members assembled together about optical fibers.

As shown in FIG. 3, each cover member is molded in one piece from plastic material and comprises a rearmost cable holding portion 14 and a forwardly divergent, optical fiber guiding portion 15 which extends at a front end to a ferrule assembly housing receiving portion formed by a transversely extending recess 15b. The cable holding portion 14 is formed with a central, axially extending recess dimensioned to receive and locate the reinforcing fiber clamping tubes 9 and 10 between rear and front stop surfaces 16a and 16b, respectively. Through-apertures 17 are formed in the cable holding portion, one on each side of the recess 16 for receiving fastening screws 12. As shown in FIG. 2, a cylindrical projection 17a extends around one through-aperture of each cover member while the other through-aperture is counter-bored to provide a seat 17b of depth approximately equal to the height of the cylindrical part 17a enabling the cylindrical parts to seat in the recesses when the cover members are superimposed thereby to locate the cover members together. A cut-out 18 for receipt of the cable strain relief member 11 is formed at the rear end of the cable holding portion 14 and communicates at a forward end with the rear, stop surface 16a of the recess 16. A pair of L-shaped grooves 20 open to adjacent opposite longitudinal edges of the cable holding portion 14 for receipt of a pair of resilient metal latching hasps 19 which form one element of a connector latching mechanism. The optical fiber guiding portion 15 comprises five pairs of parallel optical fiber guiding walls 22 which diverge in gently curving fashion as they extend from a location adjacent a front end 16b of the recess 16 to the recess 15b. The radii of curvature of the outermost of the pairs of guide walls 22 are smaller than the radii of curvature of the innermost pairs, but no less than a predetermined amount, so as not to permit a curvature decay to be produced by excessive curvature of the optical fibers, which would increase the transmission loss, which is a fatal defect. In this example, with optical fibers 21 having a diameter of 0.60 mm, (optical fiber core diameter 0.25 mm), the minimum radius of curvature must not be less than 40 mm. The separation of the individual guide walls 22 forming each pair is slightly greater than the outer diameters of the optical fiber core wires and the height of each separating wall is substantially greater than the outer diameters of the optical fibers with a result that, as shown in FIG. 4, when the upper and lower covers are assembled together, free ends of the respective walls 22 of the upper and lower cover are brought into abutment defining between them optical fiber guiding passageways which limit movement both horizontally and, to a lesser degree, vertically, thereby to prevent the optical fibers adopting too small a curvature.

Tongues 15c protrude from an inner surface of a leading transverse edge 15a of the upper and lower covers, within the recesses or steps 15b receiving a rear end of housing 4.

As shown in FIGS. 5–9, a ferrule assembly for terminating prepared ends of respective optical fibers comprises an outer ferrule 25, a cylindrical metal reinforcing tube 26, and an inner ferrule 27.

The outer ferrule 25 comprises a cylindrical body wall 34 having front, mating and rear, optical fiber receiving axial ends. The front end is formed with a thickened portion 32, providing a transverse wall through which, a precisely centered, axially extending through-bore is formed, to communicate rearwardly with a socket of larger diameter, opening to the rear end. The through-bore has a rearwardly divergent section 31a forming a funnel entry guide for an optical fiber core inserted from the rear end through the socket into the through-bore, as a sliding fit. An annular groove 33 extends axially into the wall portion, co-axially of the socket, the outer diameter of the groove matching the outer diameter of the reinforcing tube 35. A mounting flange 29 extends radially outwardly from a rear end of the outer ferrule and is formed, at diametrically opposite locations, with a pair of positioning grooves 30. The front end of the outer ferrule is formed with a peripherally extending taper or chamfer 28. The ferrule is made in one piece of synthetic resin or plastic material, as by molding, but the core receiving through-bore is formed by a precision engineering technique.

As shown in FIGS. 8 and 9, the inner ferrule 27 is made in one piece of synthetic resin or plastic material and comprises a cylindrical body having a front and a rear end, the front end being formed externally with a circular rebate. A passageway extends axially through the center thereof and comprises a front core receiving section 27c communicating rearwardly with an optical fiber receiving section 27a of increased diameter. The rear end of the inner ferrule is split by a pair of slits, formed at diametrically opposite locations, which slits extend forwardly to a location spaced from and adjacent the front end. The slit walls converge as they extend forwardly. In an alternative example, the slits 27a only extend from the rear to a central part of the inner ferrule.

Figure 5A:
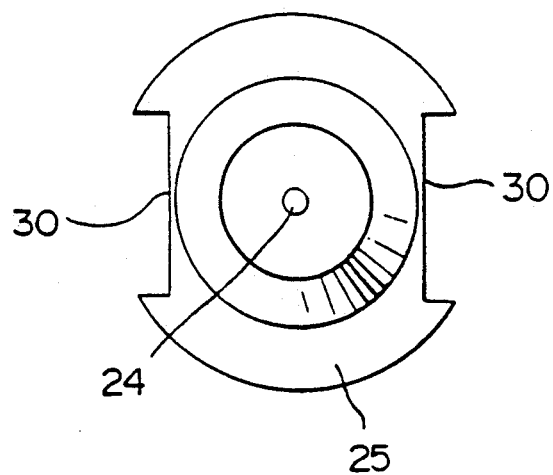
FIGS. 5(A) and (B) are, respectively, a front elevational view of a ferrule assembly for the plug connector and a cross-section view of the ferrule assembly taken along the optical axes in a vertical direction.
Figure 5B:
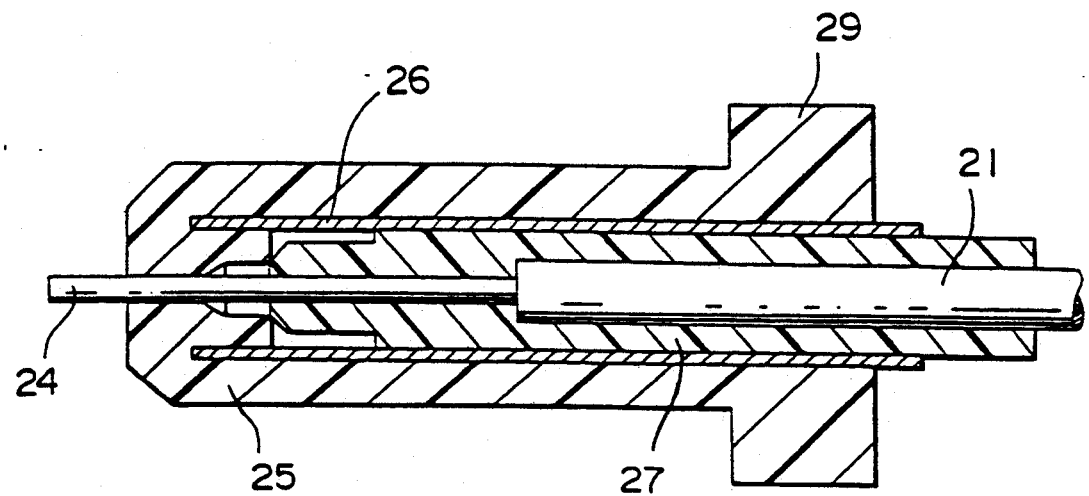

In erecting the ferrule assembly, a front end of the cylindrical reinforcing tube is force-fitted in the annular groove 33 thereby fixing the tube coaxially in the socket with a rear end protruding rearwardly outwardly therefrom. A leading end of an optical fiber 21, prepared by stripping the sheath to expose the core 24, is threaded into the inner ferrule with the rear end of the inner ferrule spread apart to facilitate the entry of the optical core accurately into the through passageway 27c, as a sliding fit. The sub-assembly of the inner ferrule and the prepared end of the optical fiber are then force-fitted into the sub-assembly formed by the metal sleeve and the outer ferrule, entry being facilitated by the rebated guiding leading end 27d thereof, the sleeve accurately guiding the leading end of the optical fiber core which protrudes from the inner ferrule into the through-bore 31 as a precision sliding fit, such entry being facilitated by the funnel entry guide portion 31a. The compressive forces produced during the force fitting of the subassembly assembly of the inner ferrule and prepared end of the optical fiber into the metal tube ensure stable retention of the optical fiber in the inner ferrule while also affording good strain relief as the rear, optical fiber receiving portion is compressed against the optical fiber sheath. However, the metal tube prevents any radially outwardly directed stresses being transmitted to the outer ferrule ensuring that the outer ferrule maintains a precise shape and is not split or damaged in any way by the insertion. The reinforcing tube also supports the body wall of the outer ferrule in a stable cylindrical configuration. Thus assembled, the central axis of the optical fiber core and the central axes of the inner and outer ferrules are in precise co-axial alignment as shown in FIG. 5(b).

Subsequently, the portion of the optical fiber element protruding from the outer ferrule 25 is cut and the surface of the cut end is polished by a known technique to form an optical face.

As shown in FIGS. 10(A)-(D), the ferrule assembly housing 4 has an approximately rectangular outer profile, having front and rear elongate faces between which extend five ferrule receiving sockets of cylindrical cross-section, aligned axially of the connector. Internal partition walls 42 extend radially across the sockets 41 in a direction longitudinally of the housing, as shown in FIG. 10(D), at locations slightly forward of the center of the sockets. Apertures 43 extend through centers of respective partition walls 42 and have inner diameters sufficiently large to permit insertion of the front, mating ends of the outer ferrules 25 of the ferrule assembly 5 to be inserted therethrough. Anti-rotation protrusions 44 are formed at diametrically opposite locations of each inner wall of each socket 41 adjacent the rear face of the ferrule assembly housing 4. The protrusions engage in the positioning grooves 30 of the ferrules, when inserted into the respective sockets to prevent rotation thereof.

When the ferrule assemblies 5 are inserted via the rear face of the housing 4 into respective ferrule receiving sockets 41, abutment of respective rear flanges 29 with respective partition walls ensures that the front cover mating ends of the outer ferrules 25 protrudes by a controlled, limited, amount from the front mating face of the housing.

Channel-shaped walls 45 are formed at opposite longitudinal ends of the housing and define through-passageways extending between front and rear faces, parallel to the ferrule receiving sockets 41 and receive haspform, resilient metal latching arms 19, shown in FIG. 2. A pair of axially extending guiding grooves 47 are formed in an outer surface 46 of an upper major wall of the ferrule housing for providing guidance during mating insertion of the housing into the multi-way, receptacle 100.

Latching hooks 49, for latching retention of the ferrule assembly retaining cover 6, extend rearwardly, equally spaced apart in two rows from locations adjacent opposite longitudinal edges of the rear face of the housing 4.

Grooves 50 extend from open ends of the mating face axially forwardly in opposite major elongate side walls adjacent corners of the housing. Forward ends of such grooves are covered by an upper wall portion 50a defining blind sockets or cavities.

Figure 12:
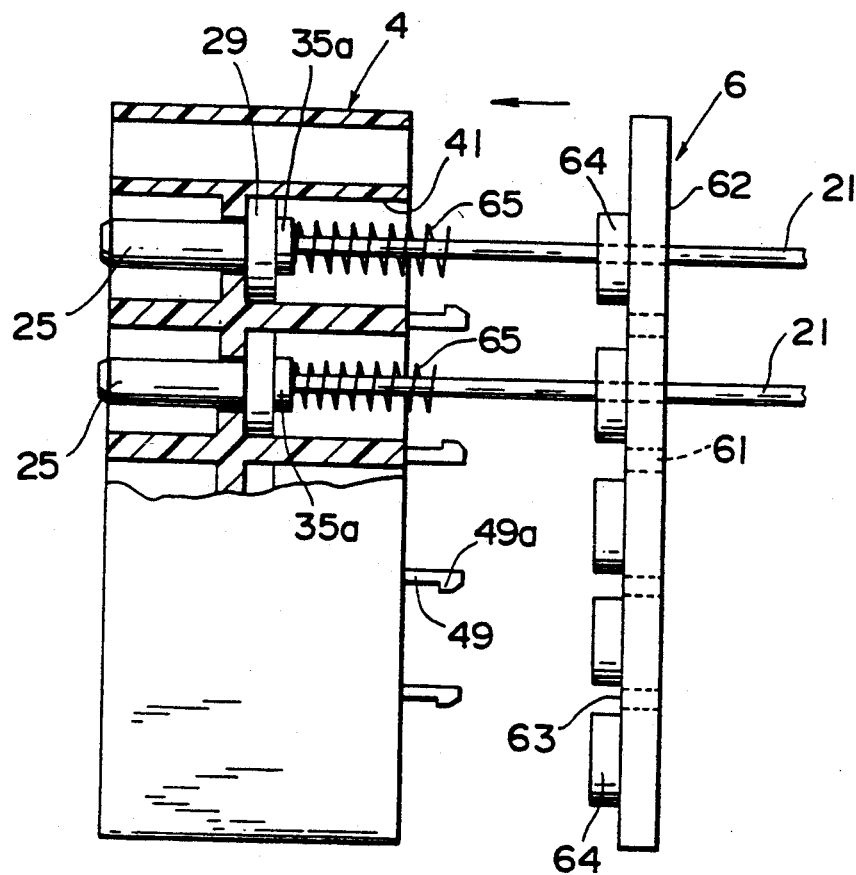
FIG. 12 is an underplan of the ferrule housing, partly in cross-section, with ferrule assemblies mounted therein and a ferrule assembly retaining member aligned for assembly therewith.
Figure 13:
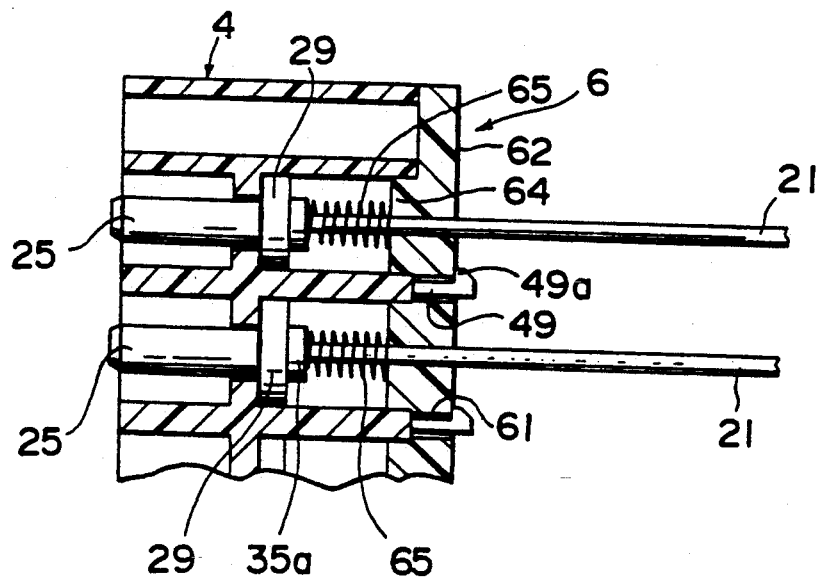
FIG. 13 is a cross-sectional view of the ferrule housing with the ferrule assemblies mounted therein and the retaining cover in latching engagement therewith.
Figure 14A:
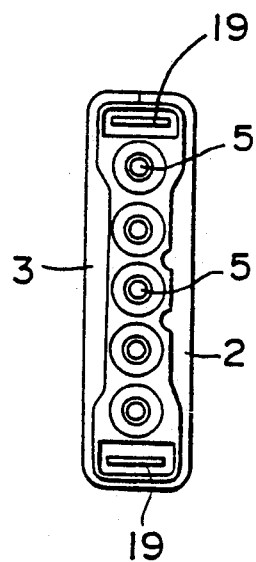
FIGS. 14(A) and (B) are, respectively, a front elevation and a plan view, partly in cross-section, of a plug connector with its constituent parts assembled.
Figure 14B:
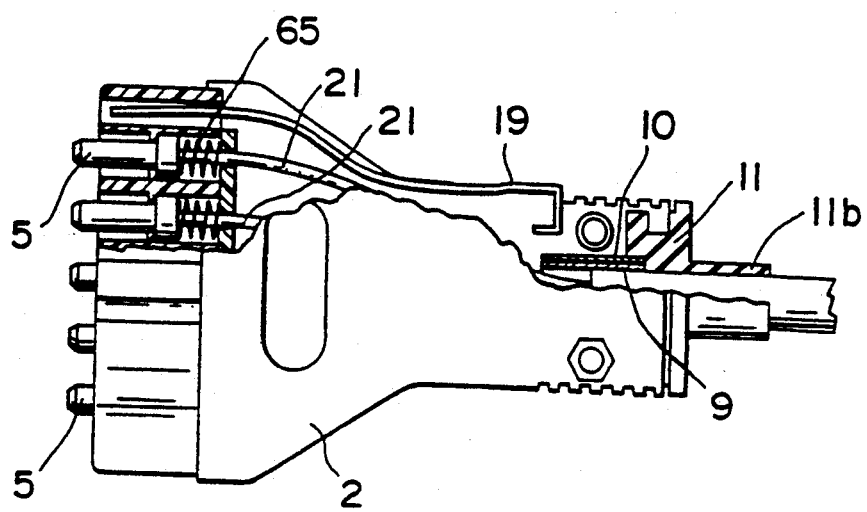

As shown, more particularly, in FIGS. 12 and 13, the ferrule assembly retaining cover 6 is molded in one piece of plastic material and includes an elongate plate-like portion from a forward face of which extend five spring engaging protrusions 64 for receipt in the ferrule receiving sockets 41. Latching apertures 61 extend through the plate-like portion at locations between adjacent protrusions 64, such latching apertures being pitched somewhat more narrowly than the pitch of the latching hooks and being of slightly smaller cross-section than the latching hooks, so that latching hooks will be both resiliently flexed and compressed during passage therethrough and resile back into latching engagement with a rear face of the plate-like portion with a snap action.

The ferrule assemblies are mounted in the housing 4 with the optical fibers having previously been threaded through bores in the retaining cover 6 and through respective coil springs 65 prior to termination by the ferrule assembly, by insertion front, mating ends leading, through the rear face of the housing 4 into the respective ferrule receiving sockets 41 until the mounting flanges thereof abut against the partition walls 42, ensuring that the outer ferrules 25 protrude by a predetermined amount beyond the mating face. The retaining cover 6 is latched on the rear face of the housing 4 by receipt of the latching members 49a through the apertures 63 with the protrusions 64 fitted into the rear ends of the sockets 41 compressing coil springs 65, thereby maintaining the mounting flanges 29 in abutment with the partition walls 41 and, in consequence, the individual ferrule assemblies accurately positioned in the housing 4.

The ferrule assembly housing 4, assembled with the ferrule assemblies 25, is then mounted in the upper and lower covers 2 and 3, respectively, by sliding the tongues 15c along the respective grooves 50 into the blind sockets or cavities formed at forward ends thereof by the upper wall 50a of the housing. The rear end of the ferrule assembly housing 4 is then dropped into the recess or step 15 i.e. moved laterally. This procedure is followed for each cover in turn with the result that opposite pairs of walls 22 defining the passageways 23 retaining the optical fibers are located in engagement ensuring that the optical fibers maintain a minimum radius of curvature.

Figure 15:
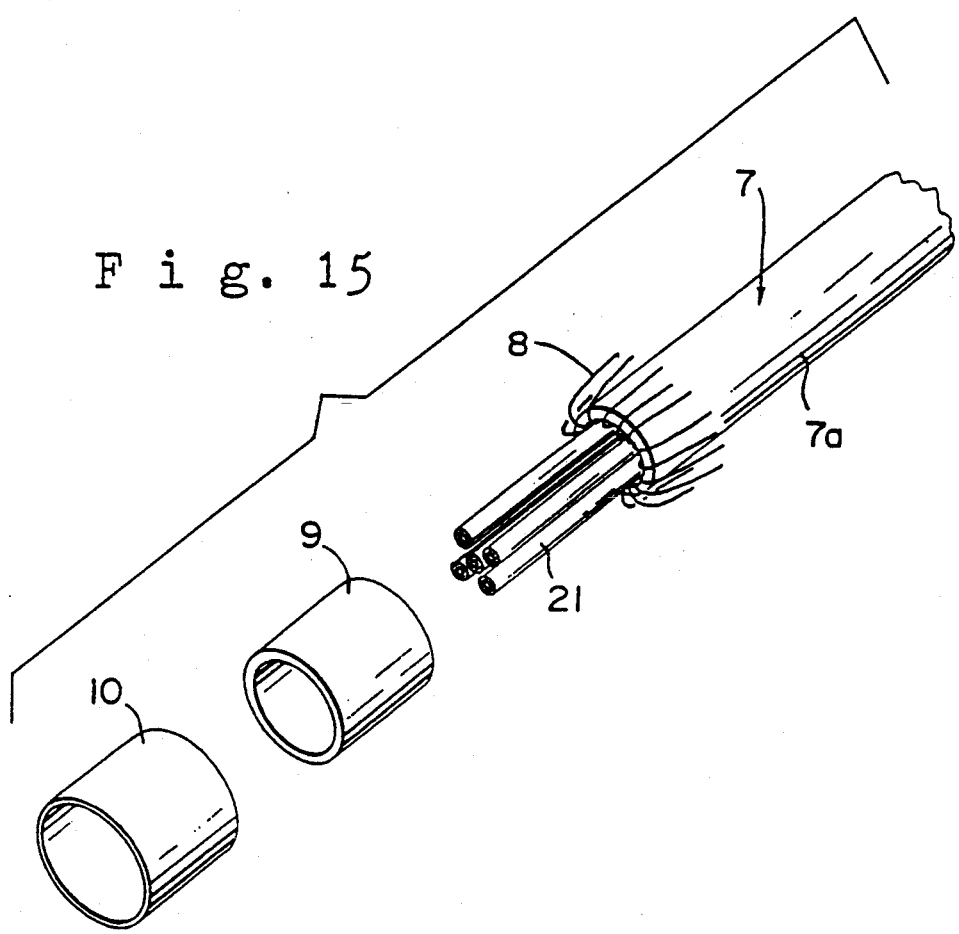
FIG. 15 is an exploded view of tubular collars of a reinforcing fiber clamping assembly aligned with a prepared end of an optical fiber cable.
Figure 16:
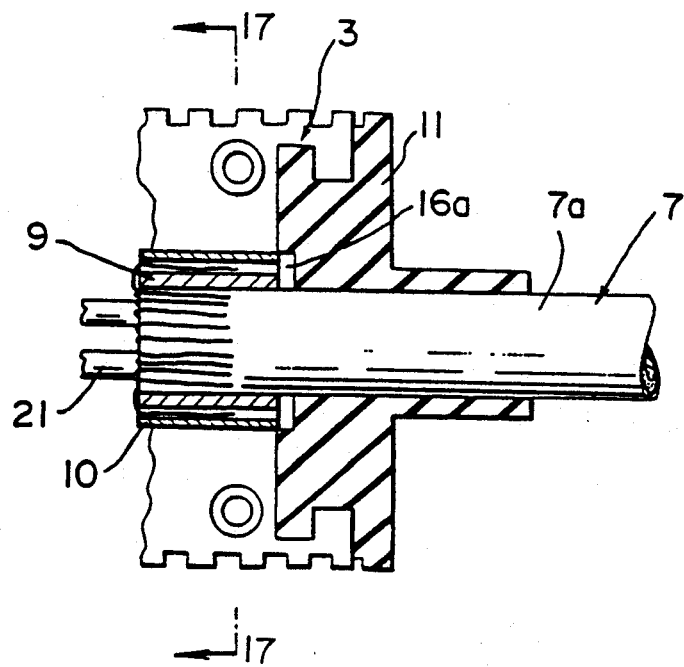
FIG. 16 is an enlarged cross-sectional view of the prepared end of the optical fiber cable located in a cover member with the clamping tubes assembled entrapping the reinforcing fibers.

Inner and outer tubular clamping collars 9 and 10, shown in FIGS. 15 and 16, are utilized for clamping the cable reinforcing fibers 8 adjacent the cable. The outer clamping collar 10 has a thinner wall than the inner clamping collar 9 and is made of a soft easily deformed metal, such as brass, although other materials could be used, provided the outer clamping collar 10 remains more easily deformed than the inner clamping collar 9. As a first step in clamping the reinforcing fibers 8, the inner clamping collar 9 is passed rearwardly over the outer sheaths 7a of the optical fiber 7 from the prepared end thereof, the previously exposed reinforcing fibers 8 are reversely bent to extend axially rearwardly completely to cover the outside of the inner clamping collar 9 and, the outer clamping collar 10 is then placed thereover, trapping the reinforcing fibers 8 between the two clamping collars. The assembly so formed is then inserted into the recess 16 in the lower cover 3 and the upper cover 2 located thereon aligning both recesses 16 so that rear axial ends of both clamping collars are restrained from axial movement both rearwardly and forwardly out of the recess 16 by engagement with the stop ends 16a and 16b at the rear and front of the recesses.

The cable clamping member or hood 11 is molded from a flexible polyurethane resin and comprises a tubular, sleeve-forming part 11b protruding rearwardly from a rear face of a flange-shaped main body part 11a. In use, the cable 7 is inserted through both the tubular part and the main body part so that the cable supporting 11 is located behind the reinforcing fiber clamping collars 9 and 10. As shown in FIG. 16, the cable supporting member assembled on the cable 7 is snugly received in the cut-outs 18 in the upper and lower covers 2 and 3, respectively.

In assembling the multi-way, optical fiber plug connector, the ferrule assembly housing 4 is mounted in the recess 15b of the lower cover member and the separated optical fibers 21 are dressed into the passageways 23 formed by adjacent walls 22 of respective wall pairs. As the passageways 23 do not extend completely up to the recess 16, the bundled optical fibers 21 are received therebetween and threaded through the inner reinforcing fiber clamping collar 9. The exposed reinforcing fibers 8 are then dressed to extend rearwardly over the collar 9, as described above, and the clamping collar 10 is then slid thereover, trapping the reinforcing fibers 8 between the two collars. Subsequently, the clamping collar assembly and the cable supporting member or hood 11 previously placed adjacent the axial rear of the clamping collars are located in the recess 16 of the lower cover and in the cable hood receiving recess or cut-out 18, respectively.

The hooked rear ends of the latching arms 19 are then inserted in the grooves 20 of the lower cover 3 and the upper cover 2 is applied against the lower cover bringing the cylindrical projections 17a on one part into mating engagement with the counter-bores 17b of the other part, locating the upper and lower covers together.

Figure 17:
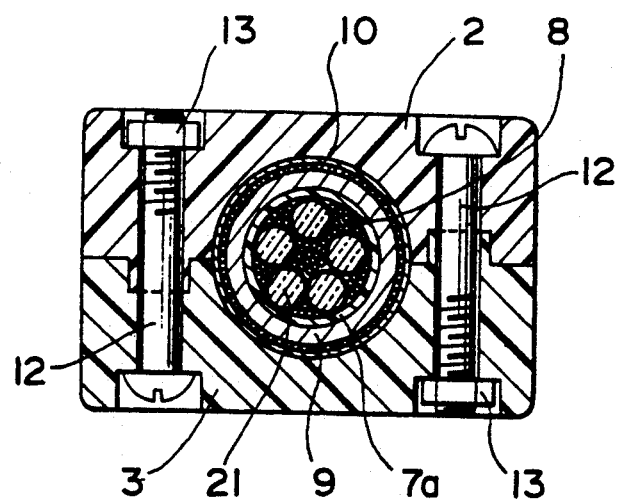
FIG. 17 is a cross-sectional view along line A—A of FIG. 16.

Screws 12 are then inserted through the apertures 17 and tightened, causing the inner surfaces of the recesses 16 and the upper and lower covers 2 and 3, respectively, to bear against the relatively thin, outer clamping collar 10, deforming the collar radially inwardly into clamping engagement with the inner clamping collar 9 having the thicker wall, which remains undeformed by the compressing force, resulting in the reinforcing fibers trapped between the two collars being firmly clamped thereby, as shown in FIG. 17.

This results in a very widely distributed force being imposed on the outer clamping collar 10, avoiding any local concentration of spot loads being placed on the optical fibers obviating risk of accidental damage thereto. This arrangement also has the advantage that the reinforcing fibers are clamped at the same time as the covers are finally assembled together, requiring only a single step for both operations whereas, with prior approaches, two, separate operations were necessary, one to clamp the reinforcing fibers and a second step, to attach them to the covers. This simplification reduces the assembly time and therefore the applied cost.

During the tightening of the screws, the cable supporting member 11 is also compressed by the surfaces of the cut-outs 18 of the upper and lower covers, assuring firm clamping engagement with the sheath 7a of the optical fiber cable 7 to provide additional strain relief, particularly against a tensile force caused by pulling or snagging the cable.

Figure 18:
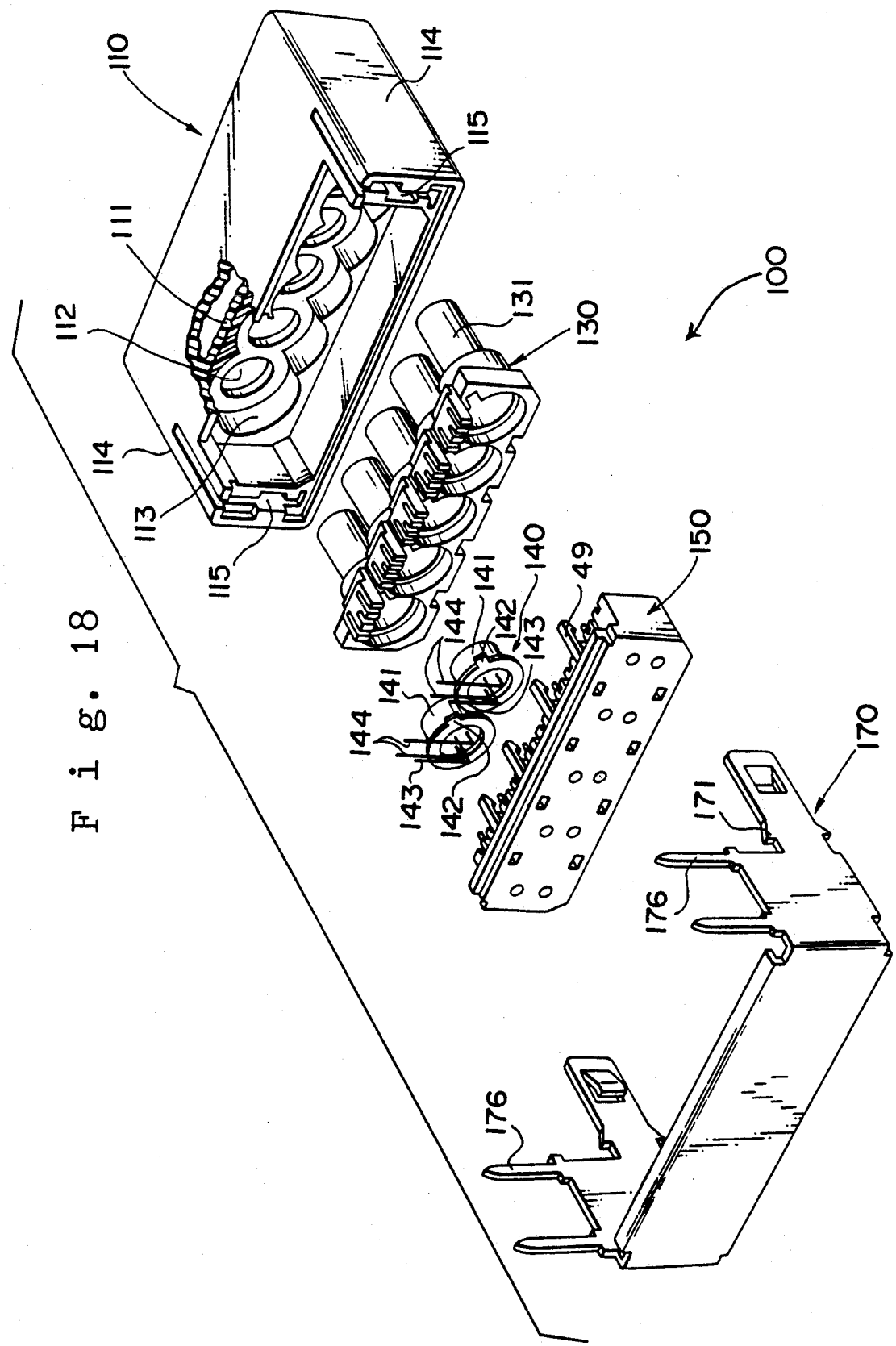
FIG. 18 is an exploded perspective view of the multi-way, electro-optic transducer receptacle connector of the invention shown inverted.
Figure 19:
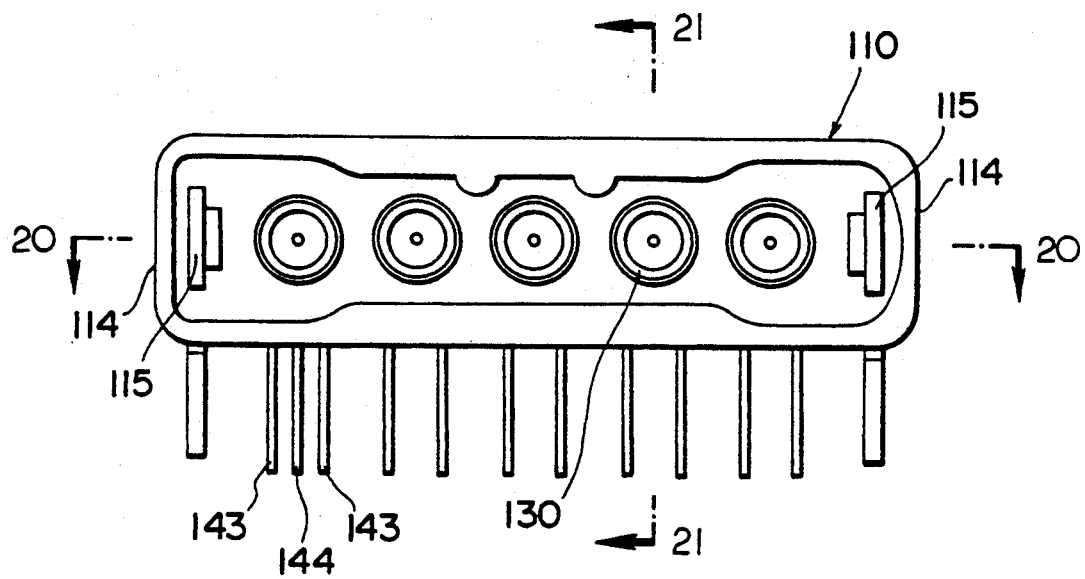
FIG. 19 is an elevational view of the front, mating face of the receptacle connector of FIG. 18.
Figure 20:
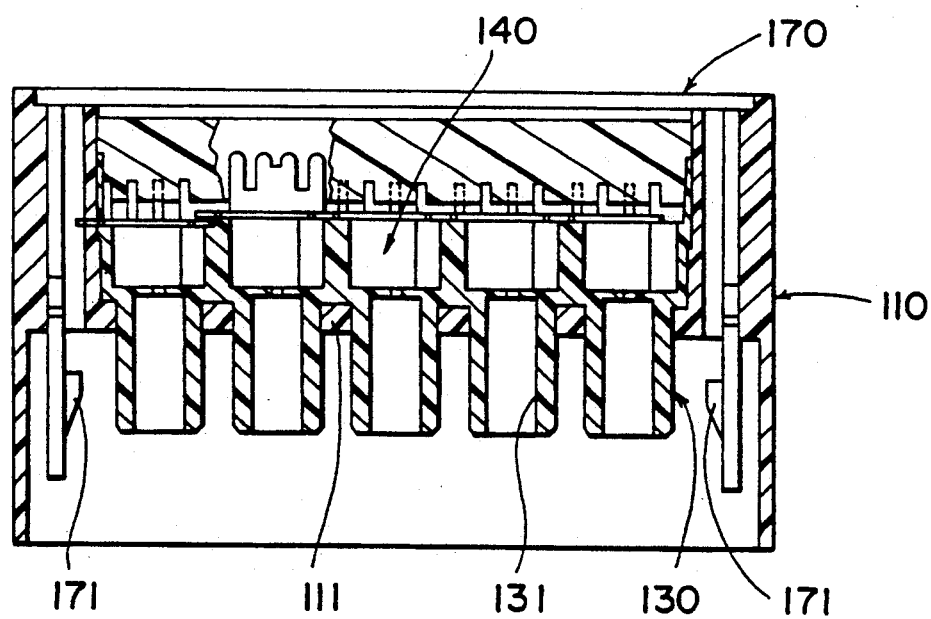
FIG. 20 is a cross-sectional view taken along line A—A in FIG. 19.
Figure 21:
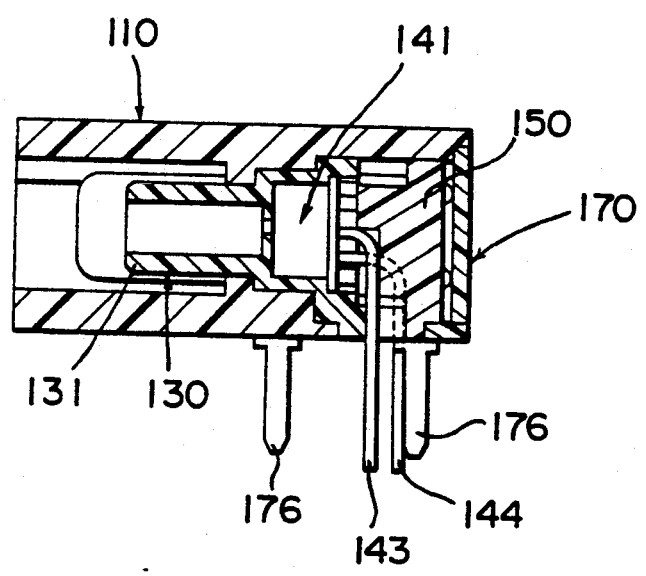
FIG. 21 is a vertical cross-sectional view taken along one of the optical axes of the receptacle connection indicated by line 21—21 in FIG. 19.

As shown in FIG. 18, the multi-way, electro-optic receptacle connector comprises a main or outer housing 110 molded from a conductive resin or plastic material into a sleeve-like, generally rectangular outer profile, a ganged sleeve member 130 molded in one piece of plastic material, a series of light emitting and receiving transducers 140 insertable therein, a retaining plate member 150 for attachment to the ganged sleeve member 130 to retain the transducers 140 mounted stably therein, and forming an insert assembly, and a rear cover plate 150 for retaining the insert assembly in the outer housing.

As shown, in particular, in FIGS. 18-23, the outer housing 110 has front, mating and rear, transducer lead receiving faces and an interior wall 111 extending transversely of mating optical axes across the housing at a location between the front and rear faces, dividing the housing interior into front, plug connector receiving and rear, insert assembly receiving compartments, opening to the front and rear faces of the outer housing, respectively. A row of through-apertures 112 are formed in the interior wall 111, communicating with front and rear compartments. A stepped seat 113 having an arcuately undulating insert supporting surface extends rearwardly from the inner wall 111 around the row of through-apertures 112.

Adjacent opposite outer end walls 114 of the outer housing, a latch arm receiving passageway 115 extends forwardly from the rear face through the interior wall 111 where it is reduced in cross-section both in a vertical and horizontal direction by a step 115a, and communicates with the plug receiving compartment, the portion of the passageway of larger cross-section forming a cavity with an inner side wall 116.

As shown particularly in FIGS. 20-24, the ganged sleeve member 130 is molded in one piece of plastic material and comprises a row of cylindrical sleeve forming portions 131, 132 extending in side-by-side, parallel relation, each sleeve forming portion being divided internally by a transverse partition wall into a front, cylindrical plug receiving section 131 and a rear, transducer receiving section 132, which sections open to front and rear faces of the ganged sleeve member, respectively. Light admitting through-bores 134 of small diameter extend through the partition walls at precise optical centers, co-axial with the sleeve forming portions.

A series of radially inwardly protruding, axially extending, transducer locating ribs 135, are formed at equally spaced intervals of 90° around the inner periphery of the transducer receiving section 132, for receiving the transducer between them in a force fit with sufficient resiliency to absorb small variations in the outer dimension of the transducer, permitting location with great accuracy therein. The locus of radially inwardly extending apices of the ribs 135 is an ideal circle of slightly smaller diameter than the diameter of the cylindrical transducers 140.

The wall of the transducer receiving section 132 is stepped inwardly to form an annular, rearwardly facing, transducer stop surface 136. A rotation preventing groove 137 is formed in each wall and opens radially to the stop surface 136.

Small tongues 142, (FIG. 18), extend radially outwardly from metal caps 141 of respective transducers and are received in the grooves 137 when the transducers are press-fitted through the rear face of the ganged housing member into respective transducer receiving sections 132, preventing rotation thereof.

A downwardly stepped flange extends rearwardly from the body of the ganged member adjacent a board engaging face in alignment with each of the transducer receiving sections and a group of relatively deep and shallow, rearwardly opening, lead admitting slots 138a and 138b, respectively, extend forwardly into each flange from a rear edge thereof, the shallow slot 138b being located between the deep slots 138a.

Different kinds of transducers 140 can be inserted into the transducer receiving sections 132. In those transducers having three leads, the central lead is received in the shallow slot 138b and the two outer leads received in the deep slots 138a. Axially extending grooves 139 are formed in upper and lower surfaces of a rear body portion of the ganged sleeve member at locations between adjacent sleeves and forwardly facing latching steps or shoulders are formed in bases thereof.

Figure 25A:
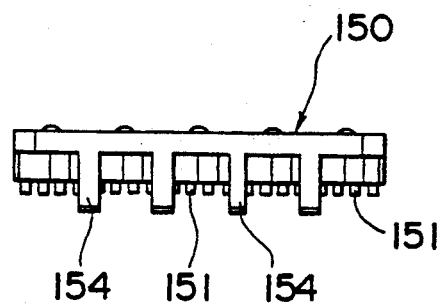
FIGS. 25(A), (B) and (C) are respectively, plan, front elevational and partly cross-sectional views, the last being taken along line 25(C)—25(C) of FIG. 25(D), of a transducer retaining plate of the receptacle connector.
Figure 25B:
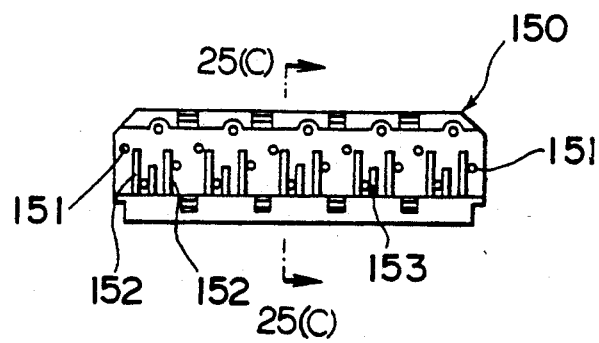
Figure 25C:
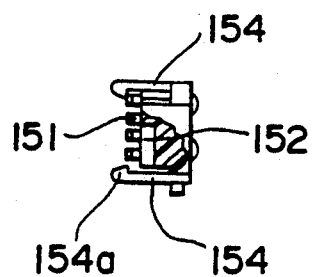
Figure 26:
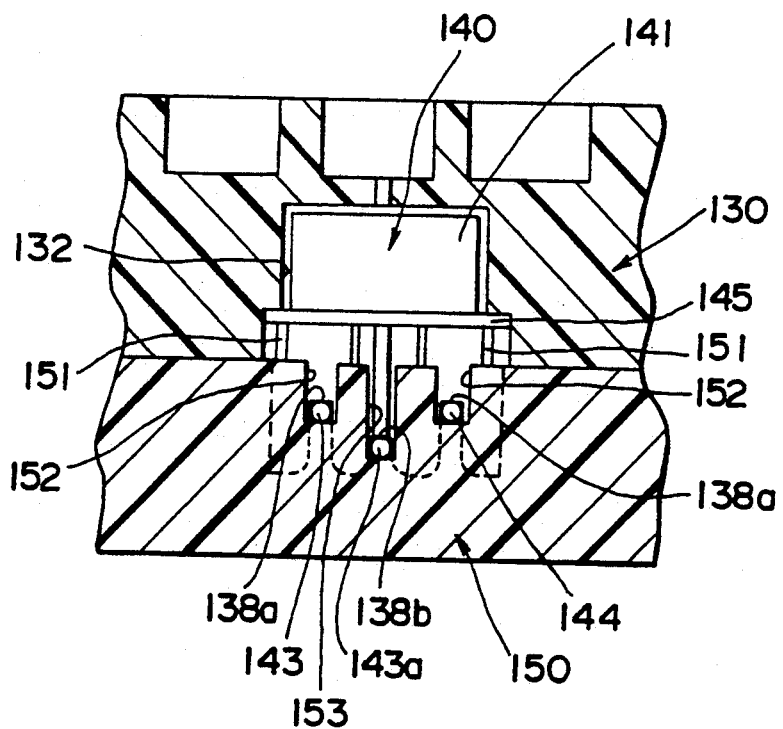
FIG. 26 is a partial cross-sectional view of an insert comprising the ganged sleeve member assembled with the retaining plate, retaining a transducer in a transducer receiving section of the ganged sleeve member.

The transducer retaining member 150, shown particularly in FIG. 25, is molded in one-piece of plastic material and comprises an elongate, generally rectangular, plate portion having a front wall surface from which small protrusions 151 of pre-determined lengths extend at locations suitable spaced for engaging a flange 145 of the cap 141 of a transducer 140, when received in the transducer receiving section 132, as shown in FIG. 26.

Lead admitting grooves 152, 153 having forwardly opening lead admitting mouths extend down the front wall surface from a medial location and open both to the front face and, at lower ends, into a rebate extending rearwardly into the front wall adjacent a board engaging face, such rebate being for receipt of flange 138 of the ganged sleeve member 130. The grooves 152, 153 are formed in groups of three on each flange and are located in spaced apart, parallel relation at a pitch corresponding to that of the grooves 138a and 138b. The central groove 153 of each group is relatively deep and the two outer grooves 152 are relatively shallow and of equal depths.

Four pairs of vertically aligned latching arms 154 each with latching hooks 154a on free ends thereof, extend forwardly from upper and lower longitudinal edges of the plate portion of the transducer retaining member 150 at a lateral spacing corresponding to that of the grooves 139 on the ganged sleeve member 130.

In assembling the ganged sleeve member 130 with the retaining member 150, the transducers 140 are pressed, active faces leading, into respective transducer receiving sections 132 until their cap flanges 145 seat against the respective annular stop surfaces 136. The leads are then bent through 90° and dressed into respective grooves 138a and 138b. The retaining member 150 is then aligned with the rear face of the ganged sleeve member 130 and pressed thereagainst, causing the latching arms 49 to be flexed apart, permitting sliding receipt of the latching hooks 154a in respective guiding grooves 139 until the latching hooks 154a resile home behind the stop shoulders at the ends of the grooves. In this condition, free ends of the retaining protrusions 151 press in retaining engagement on the flanges 145 on caps of respective transducers 140 ensuring stable retention of the transducers in the transducer receiving sections 132 with their active faces extending perpendicularly, precisely centered, on the optical axes. Simultaneously, the flange 138 of the ganged sleeve member 130 is received in the rebate of the retaining member bringing the leads 143, 144 and 143a dressed in the grooves 138a and 138b, respectively, into the grooves 152 and 153 respectively, and securely gripped between the blind ends of the registering grooves on final, latching engagement of the retaining member and the ganged sleeve member.

The above construction ensures that the retaining member 150 is securely attached to upper and lower wall portions of the ganged sleeve member obviating risk of tilting or other movement causing misalignment of the transducers.

Figure 22:
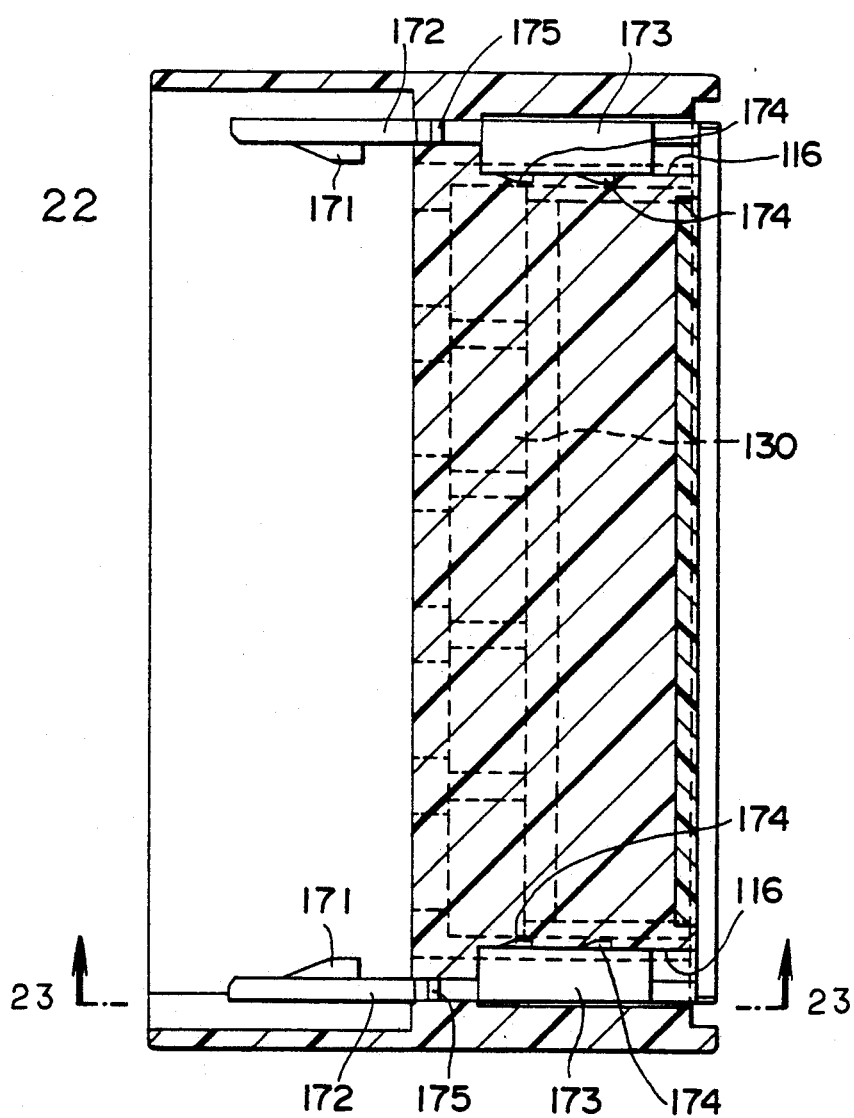
FIG. 22 is a cross-sectional view of an outer housing body of the receptacle connector taken along line 22—22 of FIG. 23, illustrating the mounting of a latching cover plate therein.
Figure 23:
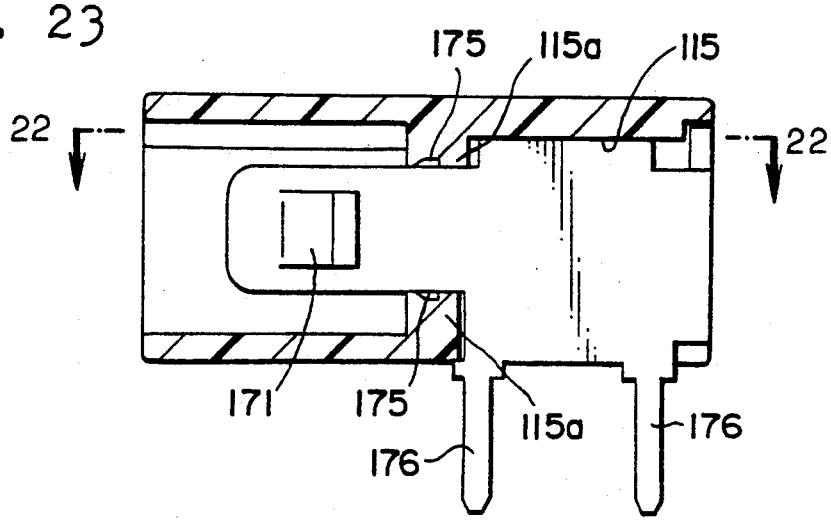
FIG. 23 is a cross-sectional view along line perpendicular to FIG. 2, showing the mounting of the cover plate in the outer housing.
Figure 24A:
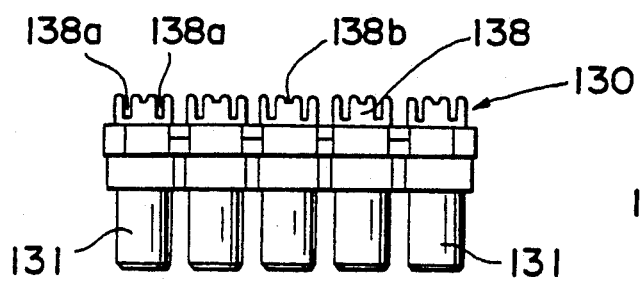
FIGS. 24 (A), (B), (C), (D), (E), (F) and (G) are plan, front elevational, perspective, horizontal cross-sectional along line 24(D)—24(D) of FIG. 24, axial cross-sectional vertical, axial cross-sectional, rear elevational and enlarged rear fragmentary views of a ganged sleeve member of the receptacle connector.
Figure 24D:
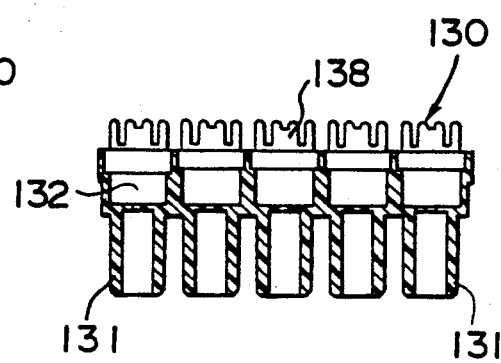
Figure 24B:
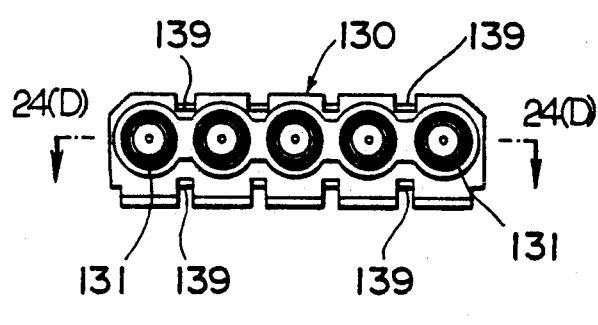
Figure 24E:
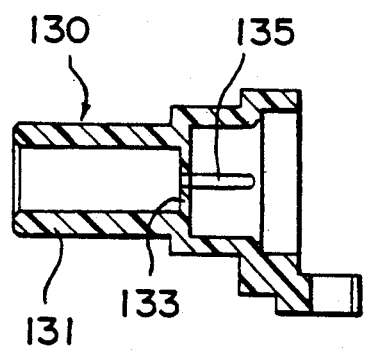
Figure 24C:
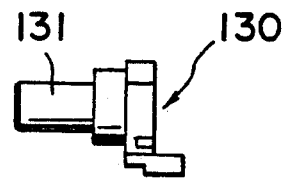
Figure 24F:
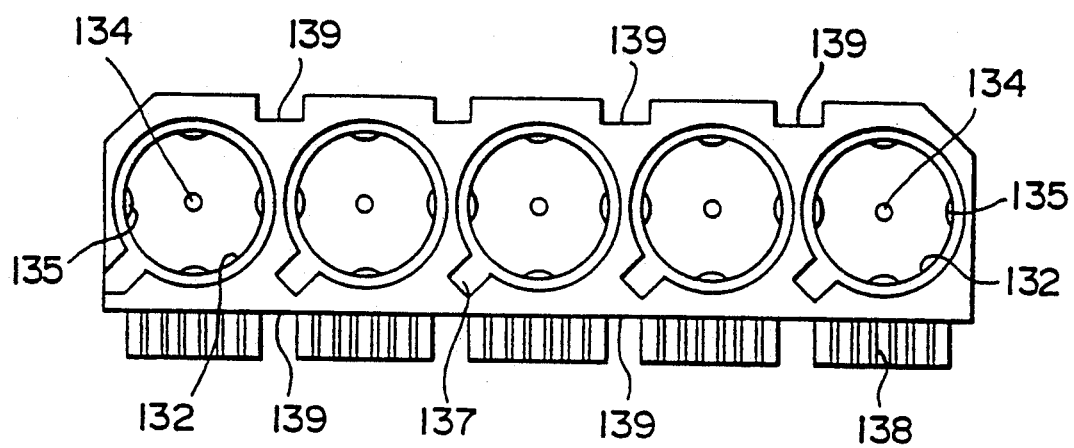
Figure 24G:
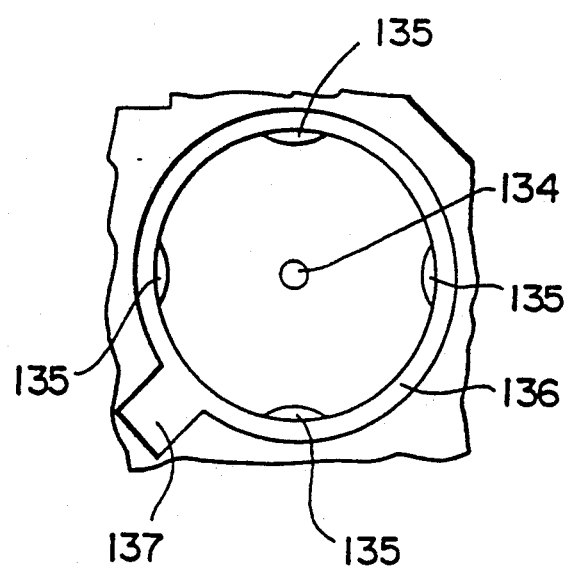

As shown in FIGS. 22 and 23, the rear cover plate 170 is stamped and formed from a single piece of sheet metal into a flat U-shaped body having opposite arms extending forwardly from a transversely extending backing plate. A pair of resilient latching arms 172 are formed as relatively narrow forward extensions of the opposite arms of the body. Catches 171 protrude inwardly from free ends of the latching arms for latching receipt in the eyes 19, 19a of the latching hasps of the plug connector, on mating the plug and receptacle connectors.

Inwardly bent flanges 173 extend from lower edges of opposite arms and anchoring tangs 174 and 175, respectively, extend inwardly from inner edges of the flanges 173 and from upper and lower edges of the latching arms 172 at locations between the catches 171 and the flanges 173. Printed circuit board mounting legs 176 extend from lowermost edges of the body arms.

As shown in FIGS. 27A–F, in assembling the multiway, electro-optic receptacle connector 100, the transducers 140 are inserted in the ganged sleeve member 130 and the retaining member 150 latched thereon in the manner explained above. The insert assembly of FIG. 27D so formed is then inserted into the outer housing 110 through the rear face with the plug receiving sections 131 extending through respective through-apertures 112, until the forwardly and rearwardly facing, insertion limiting surfaces formed by the steps on the ganged sleeve member and in the rear compartment of the outer housing, respectively, are brought into abutment, ensuring precise axial positioning of the transducers therein.

Figure 27A:
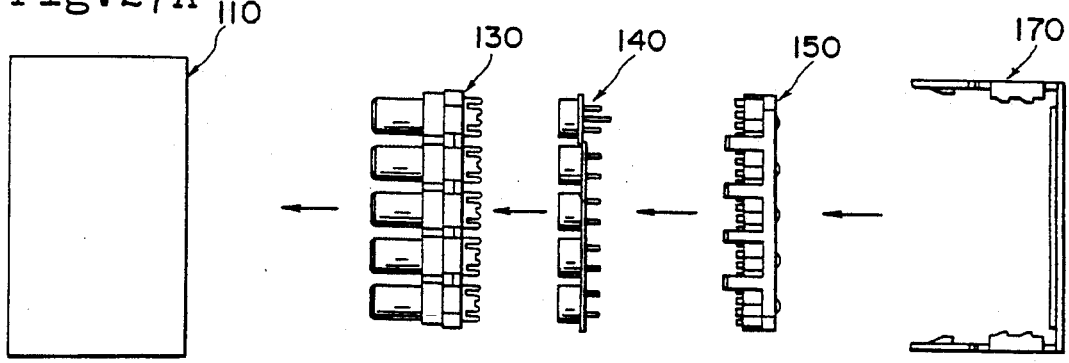
FIGS. 27A–F are elevational views showing successive stages in assembling the constituent parts of the receptacle connector.
Figure 27B:
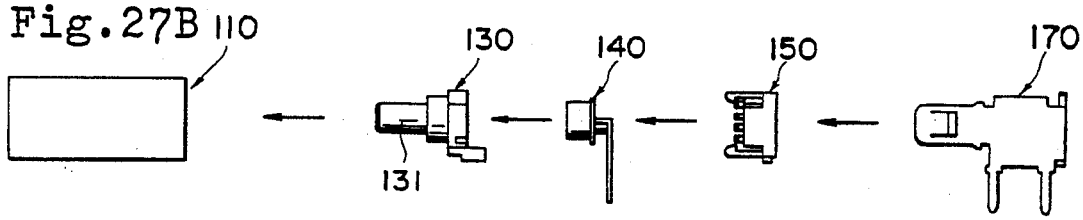
Figure 27C:
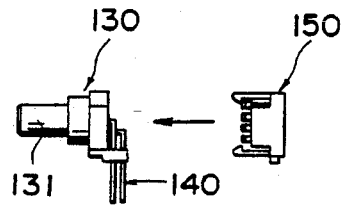
Figure 27D:
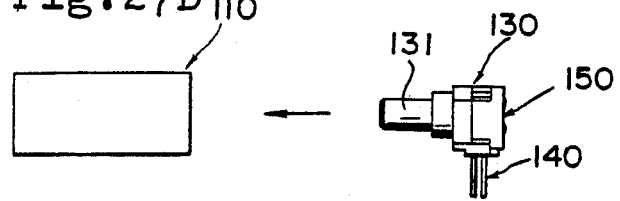
Figure 27E:
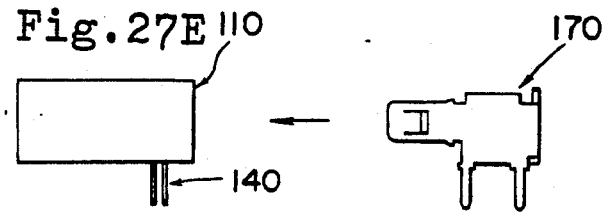
Figure 27F:
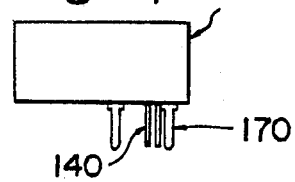

As shown in FIGS. 27E and 27F, the arms of the rear cover plate 150 are then force-fitted, with the aid of a suitable tool, through the rear face of the outer housing 110 into the passageways 115 with a lower edge of the arms entering the slotted extensions of the through-passageways 115. The tangs 174 and 175 bite into the inner rear sidewalls 116 and into the upper and lower walls of the step 115a, providing essentially four anchoring positions, ensuring firm securement therein.

As stated above, the individual transducers are relatively easily assembled in the ganged sleeve member 130 and stably retained therein with great accuracy by the retaining member 150 without risk of floating or play which would result in misalignment with consequential transmission losses. In addition, the assembly of the individual transducers in the ganged sleeve together, at one time, avoids access and manipulation difficulties which would be present if these small parts were required to be assembled one-by-one in the outer housing. The provision of the one-piece sleeve enables several independent light sources to be arranged in a single coaxial line very easily.

Figure 28:
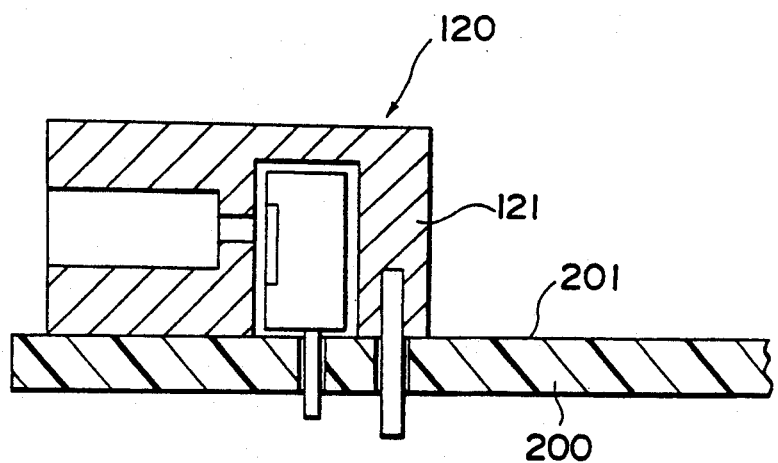
FIG. 28 is a cross-sectional view of a conventional outer receptacle body.
Figure 29:
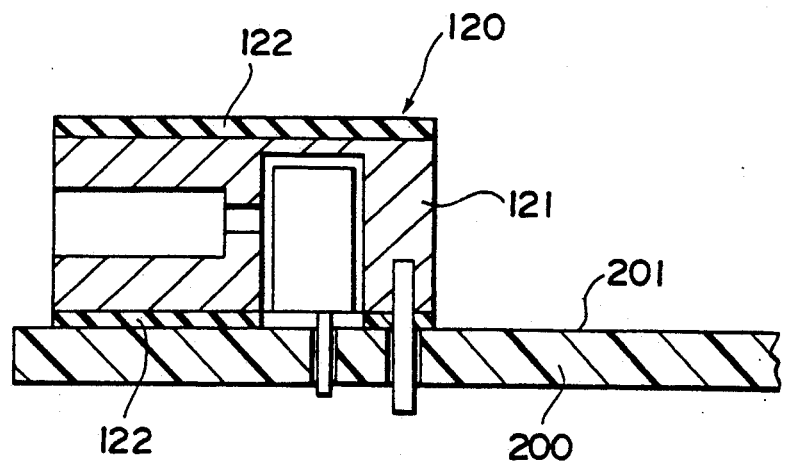
FIG. 29 is a similar cross-section showing an improved outer receptacle body.

As shown in FIGS. 28 and 29, an outer housing body 120, (corresponding to the outer housing 110), is conventionally formed from metal or conductive resin 121 to provide shielding against noise etc. However, for printed circuit board applications, where the board surface is covered with conductive tracks, an extra layer of insulation must, therefore, be interposed between the outer housing body and the surface of the printed circuit board to avoid short circuits. As shown in FIG. 29, this troublesome step can be obviated by coating the body 120 with insulating 122, thereby reducing the number of parts required and affording practical handling convenience.

We claim:

1. A ferrule assembly for terminating an optical fiber in a multi-way, plug connector comprising:

an outer ferrule made in one piece of plastic material and comprising a tubular body wall having front, mating and rear, optical fiber receiving axial ends, and defining at the front end an axially extending, optical fiber core receiving through-bore and, rearwardly thereof, an intercommunicating socket of larger diameter than the through-bore and opening at the rear end;

a rigid, reinforcing tube for receipt in the socket in coaxial relation therewith as a force fit forming a sub-assembly;

an inner, optical fiber core protecting ferrule made in one-piece of plastic material and comprising a tubular body wall having front and rear, axial ends and defining an axially extending through-passageway, the rear end of the inner ferrule being split by at least one slit formed through the wall thereof and extending axially forwardly to a location spaced rearwardly from the front end, whereby the rear end of the inner ferrule can be spread, permitting insertion of a prepared end of a optical fiber into and along the through-passageway until a portion of the core protrudes from the front, axial end and the inner ferrule subsequently force-fitted in the reinforcing tube of the subassembly to extend co-axially therewith with the protruding portion of the core received in the through-bore of the outer ferrule as a sliding fit.

2. A ferrule assembly according to claim 1, in which the inner ferrule is split by two such slits.

3. A ferrule assembly according to claim 2, in which the slits are formed in the inner ferrule at respective, diametrically opposite locations.

4. A ferrule assembly according to claim 1, in which the said at least one slit increases in width as it extends axially rearwardly.

5. A ferrule assembly according to claim 1, in which the optical fiber receiving passageway of the inner ferrule has a front, core receiving portion and a rear, optical fiber receiving portion, said at least one slit terminating at a location adjacent the front end in communication with the core receiving portion.

6. A ferrule assembly according to claim 1, in which the said at least one slit terminates at a location adjacent the middle of the inner ferrule.

7. A ferrule assembly according to claim 1, in which the outer ferrule body is formed adjacent the front end thereof with an internal, transversely extending, wall portion constituting a blind end of the socket, through which wall portion the throughbore extends and an annular groove extends into the wall portion coaxially of the socket and receives a leading axial end of the reinforcing tube in a force fit.

8. A ferrule assembly according to claim 7, in which an outer wall of the groove has a diameter matching the inside diameter of the reinforcing tube so that the reinforcing tube forms a force fit with the tubular wall.

9. A ferrule assembly according to claim 1, in which the reinforcing tube has a rear, axial end protruding axially rearwardly from the rear axial end of the outer ferrule for receiving an axial end of a ferrule biassing coil spring therein.

10. A ferrule assembly according to claim 1, in which the optical fiber core receiving through-bore of the outer ferrule has a rearwardly divergent section communicating with the socket, forming a funnel-entry guide for insertion of the optical fiber core into the through-bore.

11. A ferrule assembly according to claim 10, in which the front end of the inner ferrule is rebated externally, forming a guide portion of reduced diameter for guiding the inner ferrule into the reinforcing tube.

12. A multi-way, electro-optic connector assembly comprising a multi-way, optical fiber plug connector and a multi-way, electro-optic transducer receptacle, the multi-way, optical fiber plug connector comprising a multi-way ferrule assembly housing for receiving ferrule assemblies each comprising a n outer ferrule made in one piece of plastic material and comprising a tubular body wall having front, mating and rear, optical fiber receiving axial ends, and defining at the front end an axially extending, optical fiber core receiving through-bore and, rearwardly thereof, an intercommunicating socket of larger diameter than the through-bore and opening at the rear end;

a rigid, reinforcing tube for receipt in the socket in coaxial relation therewith as a force fit forming a sub-assembly;

an inner, optical fiber core protecting ferrule made in one-piece of plastic material and comprising a tubular body wall having front and rear, axial ends and defining an axially extending through-passageway, the rear end of the inner ferrule being split by at least one slit formed through the wall thereof and extending axially forwardly to a location spaced rearwardly from the front end, whereby the rear end of the inner ferrule can be spread permitting insertion of a prepared end of a optical fiber into and along the through-passageway until a portion of the core protrudes from the front, axial end and the inner ferrule subsequently force-fitted in the reinforcing tube of the subassembly to extend co-axially therewith with the protruding portion of the core received in the through-bore of the outer ferrule as a sliding fit; and, a multi-way, electro-optic transducer receptacle, comprising:

an outer housing comprising a sleeve-form body having a front, mating face and a rear face, an interior wall portion extending transversely of a mating axis of the connector across the housing at a location between the front and rear faces, dividing the housing interior into front, plug connector receiving and rear, insert receiving compartments opening to the front and rear faces of the housing, respectively, the interior wall being formed with a row of apertures extending therethrough between the front and rear compartments;

a transducer mounting insert assembly for receipt in the housing comprising a ganged sleeve member and a transducer retaining member, the ganged sleeve having a one-piece body with front and rear faces, a series of sleeve forming portions extending in side-by-side relation in a row between the front and rear faces, each sleeve forming portion having intercommunicating front and rear, mating and transducer receiving sections, respectively, opening to the front and rear faces of the sleeve member, a rearwardly facing transducer stop surface formed on the transducer receiving section, the transducer retaining member comprising a plate portion formed with transducer retaining means, complementary latching means on the sleeve housing and the retaining member, whereby engagement of the complementary latching means latches the retaining plate extending across the rear face of the ganged sleeve member with the retaining means engaging rear faces of respective electro-optic transducers fitted in respective transducer receiving sections, retaining them seated against the stop surface with front, active faces of the transducers precisely aligned with the central axes of the mating section; and, a rear cover plate attached to the outer housing, extending behind the retaining plate and retaining the insert assembly mounted in the outer housing with the transducer receiving sections of the ganged tube member located in the rear compartment and the plug receiving sections extending through the apertures into the plug connector receiving compartment of the outer housing.

13. A multi-way, electro-optic transducer receptacle connector for a multi-way, electro-optic connector assembly comprising:

an outer housing comprising a generally sleeve-form body having a front, mating face and a rear face, an interior wall portion extending transversely of a mating axis of the connector across the housing at a location between the front and rear faces, dividing the housing interior into front, plug connector receiving and rear, insert receiving compartments opening to the front and rear faces of the housing, respectively, the interior wall being formed with a row of apertures extending therethrough between the front and rear compartments;

a transducer mounting insert assembly for receipt in the housing comprising a ganged sleeve member and a transducer retaining member, the ganged sleeve member having a one-piece body with front and rear faces, a series of sleeve forming portions extending in side-by-side relation in a row between the front and rear faces, each sleeve forming portion having intercommunicating front and rear, mating and transducer receiving sections, respectively, opening to the front and rear of the sleeve member, a rearwardly facing transducer stop surface formed on the transducer receiving section, the transducer retaining member comprising a plate portion formed with transducer retaining means, complementary latching means on the sleeve housing and the retaining member, whereby engagement of the complementary latching means latches the retaining plate extending across the rear face of the ganged sleeve member with the retaining means engaging rear faces of respective electro-optic transducers fitted in respective transducer receiving sections, retaining them seated against the stop surface with front, active faces of the transducers precisely aligned with the central axes of the mating section; and, a rear cover plate attached to the outer housing, extending behind the retaining plate and retaining the insert assembly mounted in the outer housing with the transducer receiving sections of the ganged tube member located in the rear compartment and the plug receiving sections extending through the apertures into the plug connector receiving compartment of the outer housing.

14. A multi-way, electro-optic transducer receptacle connector according to claim 13, in which the retaining plate and the ganged sleeve member define between them lead trapping means, trapping respective leads bent to extend from the rear of respective transducers transversely of the axis, out from the insert assembly.

15. A multi-way, electro-optic transducer receptacle according to claim 14, in which the ganged sleeve member is formed with a rear wall portion and the lead trapping means comprises a series of lead receiving grooves having rearwardly opening, lead admitting mouths extending forwardly into a rear longitudinal edge of said wall portion, and a series of forwardly extending grooves having forwardly opening mouths extending across a wall of the retaining member, the forwardly and rearwardly opening grooves being brought into registration when the retaining plate is latched to the ganged sleeve member to trap respective lead wires between bottoms of respective registering grooves of the wall portion and ganged sleeve member, respectively.

16. A multi-way, electro-optic transducer receptacle according to claim 15, in which a rebate is formed in the front face of the plate portion of the retaining member at a location below the lead admitting slots and adjacent a board engaging face, and the rear wall portion comprises a flange which extends rearwardly and protrudes into the rebate, thereby bringing the forwardly and rearwardly opening slots into registration.

17. A multi-way, electro-optic transducer receptacle according to claim 13, in which the transducer retaining means comprises a series of protrusions of predetermined lengths which extend forwardly from the elongate plate wall into engagement with a rear of respective transducers thereby retaining the transducers in stable engagement with respective transducer stop surfaces.

18. A multi-way, electro-optic transducer receptacle according to claim 13, in which the stop surfaces are defined by rearwardly facing steps formed in respective sleeve walls.

19. A multi-way, electro-optic transducer receptacle according to claim 13, in which the rear, transducer receiving section of each sleeve is formed with a series of radially inwardly protruding, axially extending, transducer locating ribs, located at intervals around the inner periphery of a wall thereof, the ribs receiving the transducer between them in a force fit.

20. A multi-way, electro-optic transducer receptacle according to claim 13 in which the outer housing is formed with passageways extending between front and rear faces adjacent opposite ends of the row of apertures and the rear cover plate has spaced apart, forwardly extending, resilient latching arms with catch means at free ends thereof, which arms extend forwardly through respective passageways into the plug connector receiving cavity for latching engagement as a snap fit with complementary latching means on the plug connector.

21. A multi-way, electro-optic transducer receptacle according to claim 19 including transducer locating means comprising radially extending rebates formed in respective walls of the transducer receiving sections.

22. A multi-way, electro-optic connector assembly according to claim 12, further comprising a plurality of optical fiber cover
   members having front ends for attachment to the ferrule assembly housing and rear ends for attachment to an optical fiber cable, at least one of the cover members having individual optical fiber receiving channels extending forwardly, between front and rear ends, and progressively curving apart, at cuvatures of at least a predetermined minimum sufficient to guide the optical fibers therein without transmission losses arising from curvature.

23. A multi-way, electro-optic connector assembly according to claim 12, further comprising a plurality of optical fiber cover
   members having front ends for attachment to the ferrule assembly housing and rear ends for attachment to an optical fiber cable, the rear ends being formed with cable clamping recesses, inner and outer cable clamping collars, the outer collar being of larger radial size and more easily deformed than the inner collar and the collars being located, one inside the other, on the optical fiber cable adjacent an exposed end thereof, with exposed, rearwardly bent, reinforcing fibers of the cable trapped between them, and received in the recesses with the outer collar deformed radially inwardly by engagement with the walls of the recesses clamping the reinforcing fibers against the inner collar.

24. An optical fiber cable cover member assembly for a multi-way, optical fiber connector comprising a plurality of optical fiber cover means having front and rear ends, at least one of the cover members having individual optical fiber receiving channels extending forwardly, between front and rear ends, and progressively curving apart each channel receiving each optical fiber as a close fit in the direction of curvature, and having radii of curvatures of at least 160% of the optical fiber core diameter and at least one channel having a portion of radius of curvature of 160% of the optical fiber diameter thereby to guide optical fibers therein without transmission losses arising from curvature.

25. An optical fiber cable clamping assembly comprising a plurality of optical fiber cover members having rear ends for attachment to an optical fiber cable and formed with cable clamping recesses, inner and outer cable clamping collars, the outer collar being of larger radial size and more easily deformed than the inner collar and the collars being located, one inside the other, on the optical fiber cable adjacent an exposed end thereof, with exposed, rearwardly bent, reinforcing fibers of the cable trapped between them, and received in the recesses with the outer collar having been deformed radially inwardly by engagement with the walls of the recesses clamping the reinforcing fibers against the inner collar.

26. A ferrule assembly for terminating an optical fiber in a multi-way, plug connector, comprising outer and inner ferrules each made in one piece of plastic material and each formed with a through-passageway with a front, optical fiber core receiving section, the through-passageway of the outer ferrule having a rearwardly opening section of larger cross-section than the front section; a tubular reinforcing member receivable as a force fit in the rearwardly opening section of the outer ferrule; the inner ferrule being formed with at least one slit extending forwardly from a rear end thereof, permitting the rear end of the inner ferrule to be spread to admit an end of on optical fiber, prepared with the core exposed, through the rear end into the through-passageway with a leading end of the core protruding forwardly from the front section thereof and the sub-assembly so formed, assembled in the outer ferrule with the leading end of the core received as a sliding fit in the front section of the through-passageway of the outer ferrule by, force-fitting the sub-assembly, core leading, into the reinforcing member housing.

* * * * *